(12) United States Patent
Vaissié et al.

(10) Patent No.: US 8,189,971 B1
(45) Date of Patent: May 29, 2012

(54) DISPERSION COMPENSATION IN A CHIRPED PULSE AMPLIFICATION SYSTEM

(75) Inventors: Laurent Vaissié, Sherman Oaks, CA (US); James Francis Brennan, III, Matthews, NC (US)

(73) Assignee: Raydiance, Inc., Petaluma, CA (US)

( * ) Notice: Subject to any disclaimer, the term of this patent is extended or adjusted under 35 U.S.C. 154(b) by 103 days.

(21) Appl. No.: 12/077,658

(22) Filed: Mar. 19, 2008

Related U.S. Application Data

(63) Continuation-in-part of application No. 11/615,883, filed on Dec. 22, 2006, now Pat. No. 7,444,049.

(60) Provisional application No. 60/761,736, filed on Jan. 23, 2006, provisional application No. 60/762,284, filed on Jan. 25, 2006, provisional application No. 60/763,002, filed on Jan. 26, 2006, provisional application No. 60/762,791, filed on Jan. 26, 2006, provisional application No. 60/762,790, filed on Jan. 26, 2006.

(51) Int. Cl.
*G02B 6/34* (2006.01)
*H01S 3/00* (2006.01)

(52) U.S. Cl. .......................... 385/37; 359/333

(58) Field of Classification Search .................. None
See application file for complete search history.

(56) References Cited

U.S. PATENT DOCUMENTS

| | | | |
|---|---|---|---|
| 2,436,662 A | 2/1948 | Norgaard | |
| 3,459,960 A | 8/1969 | Aaland et al. | |
| 3,549,256 A | 12/1970 | Brienza et al. | |
| 3,599,019 A | 8/1971 | Nannichi et al. | |
| 3,602,836 A | 8/1971 | Young | |
| 3,622,907 A | 11/1971 | Tomlinson et al. | |
| 3,626,318 A | 12/1971 | Young | |
| 3,628,179 A | 12/1971 | Cuff | |
| 3,631,362 A | 12/1971 | Almasi et al. | |
| 3,646,469 A | 2/1972 | Buczek et al. | |
| 3,654,624 A | 4/1972 | Becker et al. | |
| 3,696,308 A | 10/1972 | Duffy et al. | |
| 3,735,282 A | 5/1973 | Gans | |
| 3,808,549 A | 4/1974 | Maurer | |

(Continued)

FOREIGN PATENT DOCUMENTS

EP 214100 A 3/1987

(Continued)

OTHER PUBLICATIONS

Stock et al., "Chirped Pulse Amplification in an Erbium-doped Diber Oscillator/Erbium-doped Fiber Amplifier System", Optics Communications, North-Holland Publishing Co., Amsterdam, NL, vol. 106, No. 4/5/06, Mar. 15, 1994, pp. 249-252, XP000429901, ISSN: 0030-4018.

(Continued)

*Primary Examiner* — Omar Rojas
(74) *Attorney, Agent, or Firm* — Carr & Ferrell LLP

(57) ABSTRACT

Systems and methods for producing ultra-short optical pulses are provided. According to various embodiments, optical pulses are generated, stretched, amplified, and compressed to ultra-short lengths. In order to achieve the ultra-short lengths, dispersion compensation is provided prior to amplification and optionally before compression. Dispersion compensation prior to amplification can be performed by passing the optical pulses through a polarization-maintaining fiber that includes a nonlinear Bragg grating. In some embodiments, the optical pulses are repeatedly circulated through the polarization-maintaining fiber that includes the nonlinear Bragg grating. Dispersion compensation before compression can be achieved by passing the amplified optical pulse through another length of polarization-maintaining fiber.

9 Claims, 20 Drawing Sheets

U.S. PATENT DOCUMENTS

| | | |
|---|---|---|
| 3,851,267 A | 11/1974 | Tanner |
| 3,942,127 A | 3/1976 | Fluhr et al. |
| 3,963,953 A | 6/1976 | Thornton, Jr. |
| 4,061,427 A | 12/1977 | Fletcher et al. |
| 4,194,813 A | 3/1980 | Benjamin et al. |
| 4,289,378 A | 9/1981 | Remy et al. |
| 4,389,617 A | 6/1983 | Kurnit |
| 4,394,623 A | 7/1983 | Kurnit |
| 4,590,598 A | 5/1986 | O'Harra, II |
| 4,622,095 A | 11/1986 | Grobman et al. |
| 4,655,547 A | 4/1987 | Heritage et al. |
| 4,718,418 A | 1/1988 | L'Esperance, Jr. |
| 4,722,591 A | 2/1988 | Haffner |
| 4,750,809 A | 6/1988 | Kafka et al. |
| 4,808,000 A | 2/1989 | Pasciak |
| 4,815,079 A | 3/1989 | Snitzer et al. |
| 4,824,598 A | 4/1989 | Stokowski |
| 4,827,125 A | 5/1989 | Goldstein |
| 4,829,529 A | 5/1989 | Kafka |
| 4,835,670 A | 5/1989 | Adams et al. |
| 4,847,846 A | 7/1989 | Sone et al. |
| 4,848,340 A | 7/1989 | Bille et al. |
| 4,849,036 A | 7/1989 | Powell et al. |
| 4,902,127 A | 2/1990 | Byer et al. |
| 4,907,586 A | 3/1990 | Bille et al. |
| 4,913,520 A | 4/1990 | Kafka |
| 4,915,757 A | 4/1990 | Rando |
| 4,928,316 A | 5/1990 | Heritage et al. |
| 4,972,423 A | 11/1990 | Alfano et al. |
| 4,983,034 A | 1/1991 | Spillman, Jr. |
| 4,988,348 A | 1/1991 | Bille |
| 5,010,555 A | 4/1991 | Madey et al. |
| 5,014,290 A | 5/1991 | Moore et al. |
| 5,022,042 A | 6/1991 | Bradley |
| 5,031,236 A | 7/1991 | Hodgkinson et al. |
| 5,043,991 A | 8/1991 | Bradley |
| 5,053,171 A | 10/1991 | Portney et al. |
| 5,095,487 A | 3/1992 | Meyerhofer et al. |
| 5,098,426 A | 3/1992 | Sklar et al. |
| 5,122,439 A | 6/1992 | Miersch et al. |
| 5,132,996 A | 7/1992 | Moore et al. |
| 5,146,088 A | 9/1992 | Kingham et al. |
| 5,162,643 A | 11/1992 | Currie |
| 5,166,818 A | 11/1992 | Chase et al. |
| 5,187,759 A | 2/1993 | DiGiovanni et al. |
| 5,204,867 A | 4/1993 | Koschmann |
| 5,206,455 A | 4/1993 | Williams et al. |
| 5,233,182 A | 8/1993 | Szabo et al. |
| 5,237,576 A | 8/1993 | DiGiovanni et al. |
| 5,255,117 A | 10/1993 | Cushman |
| 5,257,273 A | 10/1993 | Farries et al. |
| 5,265,107 A | 11/1993 | Delfyett, Jr. |
| 5,267,077 A | 11/1993 | Blonder |
| 5,278,853 A | 1/1994 | Shirai et al. |
| 5,291,501 A | 3/1994 | Hanna |
| 5,293,186 A | 3/1994 | Seden et al. |
| 5,302,835 A | 4/1994 | Bendett et al. |
| 5,309,453 A | 5/1994 | Treacy |
| 5,313,262 A | 5/1994 | Leonard |
| 5,315,431 A | 5/1994 | Masuda et al. |
| 5,315,436 A | 5/1994 | Lowenhar et al. |
| 5,329,398 A | 7/1994 | Lai et al. |
| 5,331,131 A | 7/1994 | Opdyke |
| 5,367,143 A | 11/1994 | White, Jr. |
| 5,400,350 A | 3/1995 | Galvanauskas |
| 5,411,918 A | 5/1995 | Keible et al. |
| 5,414,725 A | 5/1995 | Fermann et al. |
| 5,418,809 A | 5/1995 | August, Jr. et al. |
| 5,430,572 A | 7/1995 | DiGiovanni et al. |
| 5,440,573 A | 8/1995 | Fermann |
| 5,446,813 A | 8/1995 | Lee et al. |
| 5,450,427 A | 9/1995 | Fermann et al. |
| 5,479,422 A | 12/1995 | Fermann et al. |
| 5,489,984 A | 2/1996 | Hariharan et al. |
| 5,499,134 A | 3/1996 | Galvanauskas et al. |
| 5,517,043 A | 5/1996 | Ma et al. |
| 5,520,679 A | 5/1996 | Lin |
| 5,548,098 A | 8/1996 | Sugawara et al. |
| 5,572,335 A | 11/1996 | Stevens |
| 5,572,358 A | 11/1996 | Gabl et al. |
| 5,585,642 A | 12/1996 | Britton et al. |
| 5,585,652 A | 12/1996 | Kamasz et al. |
| 5,585,913 A | 12/1996 | Hariharan et al. |
| 5,590,142 A | 12/1996 | Shan |
| 5,592,327 A | 1/1997 | Gabl et al. |
| 5,596,668 A | 1/1997 | DiGiovanni et al. |
| 5,602,673 A | 2/1997 | Swan |
| 5,602,677 A | 2/1997 | Tournois |
| 5,615,043 A | 3/1997 | Plaessmann et al. |
| 5,617,434 A | 4/1997 | Tamura et al. |
| 5,624,587 A | 4/1997 | Otsuki et al. |
| 5,625,544 A | 4/1997 | Kowshik et al. |
| 5,627,848 A | 5/1997 | Fermann et al. |
| 5,631,771 A | 5/1997 | Swan |
| 5,633,750 A | 5/1997 | Nogiwa et al. |
| 5,633,885 A | 5/1997 | Galvanauskas et al. |
| 5,642,447 A | 6/1997 | Pan et al. |
| 5,644,424 A | 7/1997 | Backus et al. |
| 5,651,018 A | 7/1997 | Mehuys et al. |
| 5,656,186 A | 8/1997 | Mourou et al. |
| 5,657,153 A | 8/1997 | Endriz et al. |
| 5,661,829 A | 8/1997 | Zheng |
| 5,663,731 A | 9/1997 | Theodoras, II et al. |
| 5,665,942 A | 9/1997 | Williams et al. |
| 5,666,722 A | 9/1997 | Tamm et al. |
| 5,677,769 A | 10/1997 | Bendett |
| 5,689,361 A | 11/1997 | Damen et al. |
| 5,689,519 A | 11/1997 | Fermann et al. |
| 5,694,501 A | 12/1997 | Alavie et al. |
| 5,696,782 A | 12/1997 | Harter et al. |
| 5,701,319 A | 12/1997 | Fermann |
| 5,703,639 A | 12/1997 | Farrier et al. |
| 5,708,669 A | 1/1998 | DiGiovanni et al. |
| 5,710,424 A | 1/1998 | Theodoras, II et al. |
| 5,720,894 A | 2/1998 | Neev et al. |
| 5,726,855 A | 3/1998 | Mourou et al. |
| 5,734,762 A | 3/1998 | Ho et al. |
| 5,736,709 A | 4/1998 | Neiheisel |
| 5,739,933 A | 4/1998 | Dembeck et al. |
| 5,770,864 A | 6/1998 | Dlugos |
| 5,771,253 A | 6/1998 | Chang-Hasnain et al. |
| 5,778,016 A | 7/1998 | Sucha et al. |
| 5,781,289 A | 7/1998 | Sabsabi et al. |
| 5,788,688 A | 8/1998 | Bauer et al. |
| 5,790,574 A | 8/1998 | Rieger et al. |
| 5,815,519 A | 9/1998 | Aoshima et al. |
| 5,818,630 A | 10/1998 | Fermann et al. |
| 5,822,097 A | 10/1998 | Tournois |
| 5,844,149 A | 12/1998 | Akiyoshi et al. |
| 5,847,825 A | 12/1998 | Alexander |
| 5,847,863 A | 12/1998 | Galvanauskas et al. |
| 5,862,287 A | 1/1999 | Stock et al. |
| 5,862,845 A | 1/1999 | Chin et al. |
| 5,867,304 A | 2/1999 | Galvanauskas et al. |
| 5,875,408 A | 2/1999 | Bendett et al. |
| 5,880,823 A | 3/1999 | Lu |
| 5,880,877 A | 3/1999 | Fermann et al. |
| 5,898,485 A | 4/1999 | Nati, Jr. |
| 5,907,157 A | 5/1999 | Yoshioka et al. |
| 5,920,668 A | 7/1999 | Uehara et al. |
| 5,923,686 A | 7/1999 | Fermann et al. |
| 5,929,430 A | 7/1999 | Yao et al. |
| 5,933,271 A | 8/1999 | Waarts et al. |
| 5,936,716 A | 8/1999 | Pinsukanjana et al. |
| 5,999,847 A | 12/1999 | Elstrom |
| 6,014,249 A | 1/2000 | Fermann et al. |
| 6,016,452 A | 1/2000 | Kasevich |
| 6,020,591 A | 2/2000 | Harter et al. |
| 6,034,975 A | 3/2000 | Harter et al. |
| 6,041,020 A | 3/2000 | Caron et al. |
| 6,061,373 A | 5/2000 | Brockman et al. |
| 6,071,276 A | 6/2000 | Abela |
| 6,072,811 A | 6/2000 | Fermann et al. |
| 6,075,588 A | 6/2000 | Pinsukanjana et al. |
| 6,081,369 A | 6/2000 | Waarts et al. |
| 6,088,153 A | 7/2000 | Anthon et al. |
| 6,099,522 A | 8/2000 | Knopp et al. |

| | | | |
|---|---|---|---|
| 6,120,857 A | 9/2000 | Balooch et al. | |
| 6,122,097 A | 9/2000 | Weston et al. | |
| 6,130,780 A | 10/2000 | Joannopoulos et al. | |
| 6,134,003 A | 10/2000 | Tearney et al. | |
| 6,141,140 A | 10/2000 | Kim | |
| 6,151,338 A | 11/2000 | Grubb et al. | |
| 6,154,310 A | 11/2000 | Galvanauskas et al. | |
| 6,156,030 A | 12/2000 | Neev | |
| 6,161,543 A | 12/2000 | Cox et al. | |
| 6,168,590 B1 | 1/2001 | Neev | |
| 6,175,437 B1 | 1/2001 | Diels et al. | |
| 6,181,463 B1 | 1/2001 | Galvanauskas et al. | |
| 6,190,380 B1 | 2/2001 | Abela | |
| 6,198,568 B1 | 3/2001 | Galvanauskas et al. | |
| 6,198,766 B1 | 3/2001 | Schuppe et al. | |
| 6,201,914 B1 | 3/2001 | Duguay et al. | |
| 6,208,458 B1 | 3/2001 | Galvanauskas et al. | |
| 6,246,816 B1 | 6/2001 | Moore et al. | |
| 6,249,630 B1 * | 6/2001 | Stock et al. | 385/123 |
| 6,252,892 B1 | 6/2001 | Jiang et al. | |
| 6,256,328 B1 | 7/2001 | Delfyett et al. | |
| 6,269,108 B1 | 7/2001 | Tabirian et al. | |
| 6,271,650 B1 | 8/2001 | Massie et al. | |
| 6,275,250 B1 | 8/2001 | Sanders et al. | |
| 6,275,512 B1 | 8/2001 | Fermann | |
| 6,281,471 B1 | 8/2001 | Smart | |
| 6,290,910 B1 | 9/2001 | Chalk | |
| 6,303,903 B1 | 10/2001 | Liu | |
| 6,314,115 B1 | 11/2001 | Delfyett et al. | |
| 6,325,792 B1 | 12/2001 | Swinger et al. | |
| 6,327,074 B1 | 12/2001 | Bass et al. | |
| 6,327,282 B2 | 12/2001 | Hammons et al. | |
| 6,330,383 B1 * | 12/2001 | Cai et al. | 385/37 |
| 6,334,011 B1 | 12/2001 | Galvanauskas et al. | |
| 6,334,017 B1 | 12/2001 | West | |
| 6,335,821 B1 | 1/2002 | Suzuki et al. | |
| 6,340,806 B1 | 1/2002 | Smart et al. | |
| RE37,585 E | 3/2002 | Mourou et al. | |
| 6,355,908 B1 | 3/2002 | Tatah et al. | |
| 6,362,454 B1 | 3/2002 | Liu | |
| 6,365,869 B1 | 4/2002 | Swain et al. | |
| 6,366,395 B1 | 4/2002 | Drake et al. | |
| 6,370,171 B1 | 4/2002 | Horn et al. | |
| 6,370,422 B1 | 4/2002 | Richards-Kortum et al. | |
| 6,396,317 B1 | 5/2002 | Roller et al. | |
| 6,400,871 B1 | 6/2002 | Minden | |
| 6,404,944 B1 | 6/2002 | Wa et al. | |
| 6,407,363 B2 | 6/2002 | Dunsky et al. | |
| 6,418,154 B1 | 7/2002 | Kneip et al. | |
| 6,418,256 B1 | 7/2002 | Danziger et al. | |
| 6,421,169 B1 | 7/2002 | Bonnedal et al. | |
| 6,433,303 B1 | 8/2002 | Liu et al. | |
| 6,433,305 B1 | 8/2002 | Liu et al. | |
| 6,433,760 B1 | 8/2002 | Vaissie et al. | |
| 6,463,314 B1 | 10/2002 | Haruna | |
| 6,482,199 B1 | 11/2002 | Neev | |
| 6,485,413 B1 | 11/2002 | Boppart et al. | |
| 6,486,435 B1 | 11/2002 | Beyer et al. | |
| 6,501,590 B2 | 12/2002 | Bass et al. | |
| 6,522,460 B2 | 2/2003 | Bonnedal et al. | |
| 6,522,674 B1 | 2/2003 | Niwano et al. | |
| 6,525,873 B2 | 2/2003 | Gerrish et al. | |
| 6,526,085 B2 | 2/2003 | Vogler et al. | |
| 6,526,327 B2 | 2/2003 | Kar et al. | |
| 6,529,319 B2 | 3/2003 | Youn et al. | |
| 6,541,731 B2 | 4/2003 | Mead et al. | |
| 6,549,547 B2 | 4/2003 | Galvanauskas et al. | |
| 6,552,301 B2 | 4/2003 | Herman et al. | |
| 6,555,781 B2 | 4/2003 | Ngoi et al. | |
| 6,556,733 B2 | 4/2003 | Dy et al. | |
| 6,567,431 B2 | 5/2003 | Tabirian et al. | |
| 6,570,704 B2 | 5/2003 | Palese | |
| 6,573,813 B1 | 6/2003 | Joannopoulos et al. | |
| 6,574,024 B1 | 6/2003 | Liu | |
| 6,574,250 B2 | 6/2003 | Sun et al. | |
| 6,576,917 B1 | 6/2003 | Silfvast | |
| 6,580,553 B2 | 6/2003 | Kim et al. | |
| 6,587,488 B1 | 7/2003 | Meissner et al. | |
| 6,597,497 B2 | 7/2003 | Wang et al. | |
| 6,603,903 B1 | 8/2003 | Tong et al. | |
| 6,603,911 B1 | 8/2003 | Fink et al. | |
| 6,621,040 B1 | 9/2003 | Perry et al. | |
| 6,621,045 B1 | 9/2003 | Liu et al. | |
| 6,627,421 B1 | 9/2003 | Unger et al. | |
| 6,627,844 B2 | 9/2003 | Liu et al. | |
| 6,642,477 B1 | 11/2003 | Patel et al. | |
| 6,647,031 B2 | 11/2003 | Delfyett et al. | |
| 6,654,161 B2 | 11/2003 | Bass et al. | |
| 6,661,816 B2 | 12/2003 | Delfyett et al. | |
| 6,661,820 B1 | 12/2003 | Camilleri et al. | |
| 6,671,298 B1 | 12/2003 | Delfyett et al. | |
| 6,677,552 B1 | 1/2004 | Tulloch et al. | |
| 6,690,686 B2 | 2/2004 | Delfyett et al. | |
| 6,695,835 B2 | 2/2004 | Furuno et al. | |
| 6,696,008 B2 | 2/2004 | Brandinger | |
| 6,697,402 B2 | 2/2004 | Crawford | |
| 6,700,094 B1 | 3/2004 | Kuntze | |
| 6,700,698 B1 | 3/2004 | Scott | |
| 6,706,036 B2 | 3/2004 | Lai | |
| 6,706,998 B2 | 3/2004 | Cutler | |
| 6,710,288 B2 | 3/2004 | Liu et al. | |
| 6,710,293 B2 | 3/2004 | Liu et al. | |
| 6,711,334 B2 | 3/2004 | Szkopek et al. | |
| 6,716,475 B1 | 4/2004 | Fink et al. | |
| 6,720,519 B2 | 4/2004 | Liu et al. | |
| 6,723,991 B1 | 4/2004 | Sucha et al. | |
| 6,727,458 B2 | 4/2004 | Smart | |
| 6,728,273 B2 | 4/2004 | Perry | |
| 6,728,439 B2 | 4/2004 | Weisberg et al. | |
| 6,735,229 B1 | 5/2004 | Delfyett et al. | |
| 6,735,368 B2 | 5/2004 | Parker et al. | |
| 6,738,144 B1 | 5/2004 | Dogariu | |
| 6,738,408 B2 | 5/2004 | Abedin | |
| 6,744,555 B2 | 6/2004 | Galvanauskas et al. | |
| 6,747,795 B2 | 6/2004 | Lin et al. | |
| 6,749,285 B2 | 6/2004 | Liu et al. | |
| 6,760,356 B2 | 7/2004 | Erbert et al. | |
| 6,774,869 B2 | 8/2004 | Biocca et al. | |
| 6,782,207 B1 | 8/2004 | Efimov | |
| 6,785,303 B1 | 8/2004 | Holzwarth et al. | |
| 6,785,445 B2 | 8/2004 | Kuroda et al. | |
| 6,787,733 B2 | 9/2004 | Lubatschowski et al. | |
| 6,787,734 B2 | 9/2004 | Liu | |
| 6,788,864 B2 | 9/2004 | Ahmad et al. | |
| 6,791,060 B2 | 9/2004 | Dunsky et al. | |
| 6,791,071 B2 | 9/2004 | Woo et al. | |
| 6,795,461 B1 | 9/2004 | Blair et al. | |
| 6,801,550 B1 | 10/2004 | Snell et al. | |
| 6,801,551 B1 | 10/2004 | Delfyett et al. | |
| 6,801,557 B2 | 10/2004 | Liu | |
| 6,803,539 B2 | 10/2004 | Liu et al. | |
| 6,804,574 B2 | 10/2004 | Liu et al. | |
| 6,807,353 B1 | 10/2004 | Fleming et al. | |
| 6,807,375 B2 | 10/2004 | Dogariu | |
| 6,815,638 B2 | 11/2004 | Liu | |
| 6,819,694 B2 | 11/2004 | Jiang et al. | |
| 6,819,702 B2 | 11/2004 | Sverdlov et al. | |
| 6,819,837 B2 | 11/2004 | Li et al. | |
| 6,822,251 B1 | 11/2004 | Arenberg et al. | |
| 6,824,540 B1 | 11/2004 | Lin | |
| 6,829,517 B2 | 12/2004 | Cheng et al. | |
| 6,834,134 B2 | 12/2004 | Brennan, III et al. | |
| 6,878,900 B2 | 4/2005 | Corkum et al. | |
| 6,882,772 B1 | 4/2005 | Lowery et al. | |
| 6,885,683 B1 | 4/2005 | Fermann et al. | |
| 6,887,804 B2 | 5/2005 | Sun et al. | |
| 6,897,405 B2 | 5/2005 | Cheng et al. | |
| 6,902,561 B2 | 6/2005 | Kurtz et al. | |
| 6,917,631 B2 | 7/2005 | Richardson et al. | |
| 6,928,490 B1 | 8/2005 | Bucholz et al. | |
| 6,937,629 B2 | 8/2005 | Perry et al. | |
| 6,943,359 B2 | 9/2005 | Vardeny et al. | |
| 6,956,680 B2 | 10/2005 | Morbieu et al. | |
| 7,002,733 B2 | 2/2006 | Dagenais et al. | |
| 7,006,730 B2 | 2/2006 | Doerr | |
| 7,022,119 B2 | 4/2006 | Hohla | |
| 7,031,571 B2 | 4/2006 | Mihailov et al. | |
| 7,068,408 B2 | 6/2006 | Sakai | |

| | | |
|---|---|---|
| 7,072,101 B2 | 7/2006 | Kapteyn et al. |
| 7,088,756 B2 | 8/2006 | Fermann et al. |
| 7,095,772 B1 | 8/2006 | Delfyett et al. |
| 7,099,549 B2 | 8/2006 | Scheuer et al. |
| 7,116,688 B2 | 10/2006 | Sauter et al. |
| 7,132,289 B2 | 11/2006 | Kobayashi et al. |
| 7,143,769 B2 | 12/2006 | Stoltz et al. |
| 7,171,074 B2 | 1/2007 | DiGiovanni et al. |
| 7,217,266 B2 | 5/2007 | Anderson et al. |
| 7,220,255 B2 | 5/2007 | Lai |
| 7,233,607 B2 | 6/2007 | Richardson et al. |
| 7,257,302 B2 | 8/2007 | Fermann et al. |
| 7,289,707 B1 | 10/2007 | Chavez-Pirson et al. |
| 7,321,605 B2 | 1/2008 | Albert |
| 7,321,713 B2 | 1/2008 | Akiyama et al. |
| 7,332,234 B2 | 2/2008 | Levinson et al. |
| 7,349,452 B2 | 3/2008 | Brennan, III et al. |
| 7,361,171 B2 | 4/2008 | Stoltz et al. |
| 7,367,969 B2 | 5/2008 | Stoltz et al. |
| 7,444,049 B1 | 10/2008 | Kim et al. |
| 7,518,788 B2 * | 4/2009 | Fermann et al. ............... 359/333 |
| 7,584,756 B2 | 9/2009 | Zadoyan et al. |
| 7,773,294 B2 | 8/2010 | Brunet et al. |
| 7,787,175 B1 | 8/2010 | Brennan, III et al. |
| 7,822,347 B1 | 10/2010 | Brennan, III et al. |
| 2001/0009250 A1 | 7/2001 | Herman et al. |
| 2001/0021294 A1 | 9/2001 | Cai et al. |
| 2001/0046243 A1 | 11/2001 | Schie |
| 2002/0003130 A1 | 1/2002 | Sun et al. |
| 2002/0051606 A1 | 5/2002 | Takushima et al. |
| 2002/0071454 A1 | 6/2002 | Lin |
| 2002/0091325 A1 | 7/2002 | Ostrovsky |
| 2002/0095142 A1 | 7/2002 | Ming |
| 2002/0097468 A1 | 7/2002 | Mecherle et al. |
| 2002/0097761 A1 | 7/2002 | Sucha et al. |
| 2002/0118934 A1 | 8/2002 | Danziger et al. |
| 2002/0153500 A1 | 10/2002 | Fordahl et al. |
| 2002/0167581 A1 | 11/2002 | Cordingley et al. |
| 2002/0167974 A1 | 11/2002 | Kennedy et al. |
| 2002/0176676 A1 | 11/2002 | Johnson et al. |
| 2002/0186915 A1 | 12/2002 | Yu et al. |
| 2002/0191901 A1 | 12/2002 | Jensen |
| 2003/0011782 A1 | 1/2003 | Tanno |
| 2003/0031410 A1 | 2/2003 | Schnitzer |
| 2003/0039442 A1 | 2/2003 | Bond et al. |
| 2003/0053508 A1 | 3/2003 | Dane et al. |
| 2003/0055413 A1 | 3/2003 | Altshuler et al. |
| 2003/0060808 A1 | 3/2003 | Wilk |
| 2003/0086647 A1 | 5/2003 | Willner et al. |
| 2003/0095266 A1 | 5/2003 | Detalle et al. |
| 2003/0123496 A1 | 7/2003 | Broutin et al. |
| 2003/0142705 A1 | 7/2003 | Hackel et al. |
| 2003/0156605 A1 | 8/2003 | Richardson et al. |
| 2003/0161365 A1 | 8/2003 | Perry et al. |
| 2003/0161378 A1 | 8/2003 | Zhang et al. |
| 2003/0178396 A1 | 9/2003 | Naumov et al. |
| 2003/0202547 A1 | 10/2003 | Fermann et al. |
| 2003/0205561 A1 | 11/2003 | Iso |
| 2003/0214714 A1 | 11/2003 | Zheng |
| 2003/0223689 A1 | 12/2003 | Koch et al. |
| 2003/0235381 A1 | 12/2003 | Hunt |
| 2004/0000942 A1 | 1/2004 | Kapteyn et al. |
| 2004/0037505 A1 | 2/2004 | Morin |
| 2004/0042061 A1 | 3/2004 | Islam et al. |
| 2004/0049552 A1 | 3/2004 | Motoyama et al. |
| 2004/0101001 A1 | 5/2004 | Bergmann et al. |
| 2004/0128081 A1 | 7/2004 | Rabitz et al. |
| 2004/0134894 A1 | 7/2004 | Gu et al. |
| 2004/0134896 A1 | 7/2004 | Gu et al. |
| 2004/0160995 A1 | 8/2004 | Sauter et al. |
| 2004/0226925 A1 | 11/2004 | Gu et al. |
| 2004/0231682 A1 | 11/2004 | Stoltz et al. |
| 2004/0233944 A1 | 11/2004 | Dantus et al. |
| 2004/0263950 A1 | 12/2004 | Fermann et al. |
| 2005/0008044 A1 | 1/2005 | Fermann et al. |
| 2005/0018986 A1 | 1/2005 | Argyros et al. |
| 2005/0035097 A1 | 2/2005 | Stoltz |
| 2005/0036527 A1 | 2/2005 | Khazaei et al. |
| 2005/0038487 A1 | 2/2005 | Stoltz |
| 2005/0061779 A1 | 3/2005 | Blumenfeld et al. |
| 2005/0065502 A1 | 3/2005 | Stoltz |
| 2005/0067388 A1 | 3/2005 | Sun et al. |
| 2005/0074974 A1 | 4/2005 | Stoltz |
| 2005/0077275 A1 | 4/2005 | Stoltz |
| 2005/0105865 A1 | 5/2005 | Fermann et al. |
| 2005/0107773 A1 | 5/2005 | Bergt et al. |
| 2005/0111073 A1 | 5/2005 | Pan et al. |
| 2005/0111500 A1 | 5/2005 | Harter et al. |
| 2005/0127049 A1 | 6/2005 | Woeste et al. |
| 2005/0154380 A1 | 7/2005 | DeBenedictis et al. |
| 2005/0163426 A1 | 7/2005 | Fermann et al. |
| 2005/0167405 A1 | 8/2005 | Stoltz et al. |
| 2005/0171516 A1 | 8/2005 | Stoltz et al. |
| 2005/0171518 A1 | 8/2005 | Stoltz et al. |
| 2005/0175280 A1 | 8/2005 | Nicholson |
| 2005/0177143 A1 | 8/2005 | Bullington et al. |
| 2005/0195726 A1 | 9/2005 | Bullington et al. |
| 2005/0213630 A1 | 9/2005 | Mielke et al. |
| 2005/0215985 A1 | 9/2005 | Mielke et al. |
| 2005/0218122 A1 | 10/2005 | Yamamoto et al. |
| 2005/0225846 A1 | 10/2005 | Nati et al. |
| 2005/0226278 A1 | 10/2005 | Gu et al. |
| 2005/0226286 A1 | 10/2005 | Liu et al. |
| 2005/0226287 A1 | 10/2005 | Shah et al. |
| 2005/0232560 A1 | 10/2005 | Knight et al. |
| 2005/0238070 A1 | 10/2005 | Imeshev et al. |
| 2005/0259944 A1 | 11/2005 | Anderson et al. |
| 2005/0265407 A1 | 12/2005 | Braun et al. |
| 2005/0271094 A1 | 12/2005 | Miller et al. |
| 2005/0271340 A1 | 12/2005 | Weisberg et al. |
| 2006/0016891 A1 | 1/2006 | Giebel et al. |
| 2006/0030951 A1 | 2/2006 | Davlin et al. |
| 2006/0050750 A1 | 3/2006 | Barty |
| 2006/0056480 A1 | 3/2006 | Mielke et al. |
| 2006/0064079 A1 | 3/2006 | Stoltz et al. |
| 2006/0067604 A1 | 3/2006 | Bull et al. |
| 2006/0084957 A1 | 4/2006 | Delfyett et al. |
| 2006/0093012 A1 | 5/2006 | Singh et al. |
| 2006/0093265 A1 | 5/2006 | Jia et al. |
| 2006/0120418 A1 | 6/2006 | Harter et al. |
| 2006/0126679 A1 | 6/2006 | Brennan et al. |
| 2006/0131288 A1 | 6/2006 | Sun et al. |
| 2006/0187974 A1 | 8/2006 | Dantus |
| 2006/0209908 A1 | 9/2006 | Pedersen et al. |
| 2006/0210275 A1 * | 9/2006 | Vaissie et al. .................. 398/84 |
| 2006/0221449 A1 | 10/2006 | Glebov et al. |
| 2006/0250025 A1 | 11/2006 | Kitagawa et al. |
| 2006/0268949 A1 | 11/2006 | Gohle et al. |
| 2007/0025728 A1 | 2/2007 | Nakazawa et al. |
| 2007/0047965 A1 | 3/2007 | Liu et al. |
| 2007/0064304 A1 | 3/2007 | Brennan, III |
| 2007/0098025 A1 | 5/2007 | Hong et al. |
| 2007/0106416 A1 | 5/2007 | Griffiths et al. |
| 2007/0121686 A1 | 5/2007 | Vaissie et al. |
| 2007/0196048 A1 | 8/2007 | Galvanauskas et al. |
| 2007/0229939 A1 | 10/2007 | Brown et al. |
| 2007/0253455 A1 | 11/2007 | Stadler et al. |
| 2007/0273960 A1 | 11/2007 | Fermann et al. |
| 2008/0232407 A1 | 9/2008 | Harter et al. |
| 2008/0240184 A1 | 10/2008 | Cho et al. |
| 2009/0219610 A1 | 9/2009 | Mourou et al. |
| 2009/0244695 A1 | 10/2009 | Marcinkevicius et al. |
| 2009/0245302 A1 | 10/2009 | Baird et al. |
| 2009/0257464 A1 | 10/2009 | Dantus et al. |
| 2009/0273828 A1 | 11/2009 | Waarts et al. |
| 2009/0297155 A1 | 12/2009 | Weiner et al. |
| 2010/0040095 A1 | 2/2010 | Mielke et al. |
| 2010/0118899 A1 | 5/2010 | Peng et al. |
| 2010/0142034 A1 | 6/2010 | Wise et al. |

FOREIGN PATENT DOCUMENTS

| | | |
|---|---|---|
| EP | 691563 A2 | 1/1996 |
| EP | 1462831 A1 | 9/2004 |
| JP | 8171103 | 7/1996 |
| JP | 11189472 A | 7/1999 |
| JP | 2003181661 A | 7/2003 |
| JP | 2003344883 | 12/2003 |
| JP | 2005174993 | 6/2005 |

| WO | WO9428972 A1 | 12/1994 |
| WO | WO2004105100 A2 | 12/2004 |
| WO | WO2004114473 A2 | 12/2004 |
| WO | WO2005018060 A2 | 2/2005 |
| WO | WO2005018061 A2 | 2/2005 |
| WO | WO2005018062 A2 | 2/2005 |
| WO | WO2005018063 A2 | 2/2005 |
| WO | WO2007034317 A2 | 3/2007 |

OTHER PUBLICATIONS

Strickland et al., "Compression of Amplified Chirped Optical Pulses", Optics Communications, North-Holland Publishing Co., Amersterdam, NL, vol. 56, No. 3, Dec. 1, 1985, pp. 219-221, XP024444933 ISSN: 0030-4018 (retrieved on 1985-12-011).

Temelkuran, B. et al., "Wavelength-scalable Hollow Optical Fibres with Large Photonic Bandgaps for CO2 Laser Transmission," Nature, Dec. 12, 2002, pp. 650-653.

Thurston, R.N. et al., "Analysis of Picosecond Pulse Shape Synthesis by Spectral Masking in a Grating Pulse Compressor," IEEE Journal of Quantum Electronics, vol. EQ-22, No. 5, pp. 682-696, May 1986.

Weiner, A.M. et al., "Synthesis of Phase-coherent, Picosecond Optical Square Pulses," Optics Letters, vol. 11, No. 3, pp. 153-155, Mar. 1986.

Weiner, A.M., "Femtosecond Optical Pulse Shaping and Processing," Prog. Quant. Electr. 1995, vol. 19, pp. 161-237, 1995.

Weiner, A.M., "High-resolution femtosecond Pulse Shaping," Journal of the Optical Society of America B. vol. 5, No. 8, pp. 1563-1572, Aug. 1988.

Wells, D.J., "Gene Therapy Progress and Prospects: electroporation and Other Physical Methods," Gene Therapy, Nature Publishing Group, vol. 11, pp. 1363-1369, Aug. 5, 2004, (http://www.nature.com/gt).

White, W.E., et al., "Compensation of Higher-order Frequency-dependent Phase Terms in Chirped-pulse Amplification Systems," Optics Letters, vol. 18, No. 16, pp. 1343-1345, Aug. 15, 1993.

Yamakawa et al., "1 Hz, 1 ps, terawatt Nd: glass laser", Optics Communications, North-Holland Publishing Co. Amsterdam, NL, vol. 112, No. 1-2, Nov. 1, 1994, pp. 37-42, XP024424285.

Yan et al., Ultrashort Pulse Measurement Using Interferometric Autocorrelator Based on Two-photon-absorbtion Detector at 1.55μm Wavelength Region., 2005, Proceedings of SPIE vol. 5633, Advanced Materials and Devices for Sensing and Imaging II, pp. 424-429.

Yeh, et al. "Theory of Bragg Fiber", Journal of the Optical Society America, Sep. 1978, pp. 1196, vol. 68, No. 9., pp. 1196-1201.

Yi, Y. et al., "Sharp Bending of On-Chip silicon Bragg Cladding Waveguide With Light Guiding on Low Index Core Materials", IEEE Journal of Selected Topics in Quantum Electronics, vol. 12, No. 6, Nov./Dec. 2006, pp. 1345-1348.

Yi, Y., et al., "On-chip Si-based Bragg Cladding Waveguide with High Index Contrast Bilayers", Optics Express, vol. 12, No. 20, Oct. 4, 2004, pp. 4775-4780.

Yin, D. et al., "Integrated ARROW Waveguides with Hollow Cores", Optics Express, vol. 12, No. 12, Jun. 14, 2004, pp. 2710-2715.

Zhou, S. et al., "Compensation of nonlinear Phase Shifts with Third-order Dispersion in Short-pulse Fiber Amplifiers," Optics Express, vol. 13, No. 13, pp. 4869-2877, Jun. 27, 2005.

Limpert et al., "All Fiber Chiped-Pulse Amplification System Based on Compression in Air-guiding Photonic Bandgap Fiber", Optics Express, Dec. 1, 2003, vol. 11, No. 24, pp. 3332-3337.

Agostinelli, J. et al., "Optical Pulse Shaping with a Grating Pair," Applied Optics, vol. 18, No. 14, pp. 2500-2504, Jul. 15, 1979.

Anastassiou et al., "Photonic Bandgap Fibers Exploiting Omnidirectional Reflectivity Enable Flexible Delivery of Infrared Lasers for Tissue Cutting," Proceedings of the SPIE—the International Society for Optical Engineering, SPIE, US, vol. 5317, No. 1, Jan. 1, 2004, pp. 29-38, XP002425586 ISSN: 0277-786X.

Benoit, G. et al., "Dynamic All-optical Tuning of Transverse Resonant Cavity Modes in Photonic Bandgap Fibers,"Optics Letters, vol. 30, No. 13, Jul. 1, 2005, pp. 1620-1622.

Chen, L. et al., "Ultrashort Optical Pulse Interaction with Fibre Gratings and Device Applications," 1997, Canaga, located at http://www.collectionscanada.ca/obj/s4/f2/dsk2/ftp04/mq29402.pfd.

Chen, X. et al., "Highly Birefringent Hollow-core Photonic Bandgap Fiber," Optics Express, vol. 12, No. 16, Aug. 9, 2004, pp. 3888-3893.

Chen, Y. et al., "Dispersion-Managed Mode Locking", Journal of the Optical Society of America B, Nov. 1999, pp. 1999-2004, vol. 16, No. 11, Optical Society of America.

Dasgupta, S. et al., "Design of Dispersion-Compensating Bragg Fiber with an Ultrahigh Figure of Merit," Optics Letters, Aug. 1, 2005, vol. 30, No. 15, Optical Society of America.

De Matos et al., "Multi-kilowatt, Picosecond Pulses from an All-fiber Chirped Pulse Amplification System Using Air-core Photonic Bandgalp Fiber", Lasers and Electro-optics, 2004, (CLEO), Conference on San Francisco, CA USA, May 20-21, 2004, Piscataway, NJ, USA, IEEE, vol. May 17, 2004, pp. 973-974, XP010745448 ISBN: 978-1-55752-777-6.

De Matos, C.J.S. et al., "All-fiber Chirped Pulse Amplification using Highly-dispersive Air-core Photonic Bandgap Fiber," Nov. 3, 2003, Optics Express, pp. 2832-2837, vol. 11, No. 22.

Delfyett, P. et al., "Ultrafast Semiconductor Laser-Diode-Seeded Cr:LiSAF Rengerative Amplifier System", Applied Optics, May 20, 1997, pp. 3375-3380, vol. 36, No. 15, Octoical Society of America.

Eggleton, et al., "Electrically Tunable Power Efficient Dispersion Compensating Fiber Bragg Grating," IEEE Photonics Technology Letters, vol., 11, No. 7, pp. 854-856, Jul. 1999.

Engeness et al., "Dispersion Tailoring and Compensation by Modal Interations in Omniguide Fibers," Optics Express, May 19, 2003, pp. 1175-1196, vol. 11, No. 10.

Fink et al., "Guiding Optical Light in Air Using an All-Dielectric Structure," Journal of Lightwave Technology, Nov. 1999, pp. 2039-2041, vol. 17, No. 11.

Folkenberg, J.R., et al., "Broadband Single-polarization Photonic Crystal Fiber," Optics Letters, vol. 30, No. 12, Jun. 15, 2005, pp. 1446-1448.

Folkenberg, J.R., et al., "Polarization Maintaining Large Mode Area Photonic Crystal Fiber," Optics Express vol. 12, No. 5, Mar. 8, 2004, pp. 956-960.

Futami, F., et al., "Wideband Fibre Dispersion Equalisation up to Fourth-order for Long-distance Sub-picosecond Optical Pulse Transmission," Electronics Letters, vol. 35, No. 25, Dec. 9, 1999.

Galvanauskas, A. et al., "Chirped-pulse-amplification Circuits for Fiber Amplifiers, Based on Chirped-period Quasi-phase, matching gratings", Optics Letters, Nov. 1, 1998, p. 1695-1697, vol. 23, No. 21, Optical Society of America.

Hartl et al., "In-line high energy Yb Fiber Laser Based Chirped Pulse Amplifier System", Laser and Electro-Optics, 2004, (CLEO) Conference of San Francisco, CA USA May 20-21, 2004, Piscataway, NJ, USA, IEEE, vol. 1, May 17, 2004, pp. 563-565, XP010745382, ISBN: 978-1-55752-7777-.

Hellstrom, E. et al., "Third-order Dispersion Compensation Using a Phase Modulator", Journal of Lightwave Technology, vol. 21, No. 5, pp. 1188-1197, May 2003.

Heritage, J. P. et al., "Picosecond Pulse Shaping by Spectral Phase and Amplitude Manipulation," Optics Letters, vol. 10, No. 12, pp. 609-611, Dec. 1985.

Heritage, J.P. et al., "Spectral Windowing of Frequency-Modulated Optical Pulses in a Grating Compressor," Applied Physics Letters, vol. 47, No. 2, pp. 87-89, Jul. 15, 1985.

Hill, K. et al., "Fiber Bragg Grating Technology Fundamentals and Overview," Journal of Lightwave Technology, Aug. 1997, vol. 15, No. 8, pp. 1263-1276.

Ibanescu et al., "Analysis of Mode Structure in Hollow Dielctric Waveguide Fibers, "Physical Review E 67, 2003, the American Physical Society.

Jiang, et al., "Fully Dispersion Compensated ~500 fs Pulse Transmission Over 50 km Single Mode Fiber," Optics Letters, vol. 30, No. 12, pp. 1449-1451, Jun. 15, 2005.

Jiang, et al., "Fully Dispersion Compensated ~500 fs Pulse Transmission Over 50 km Single Mode Fiber," Purdue University ECE Annual Research Summary, Jul. 1, 2004-Jun. 30, 2005.

Killey, et al., "Electronic Dispersion Compensation by Signal Predistortion Using Digital Processing and a Dual-Drive Mach-Zehnder Modulator," IEEE Photonics Technology Letters, vol. 17, No. 3, pp. 714-716, Mar. 2005.

Kim, K. et al., "1.4kW High Peak Power Generation from an All Semiconductor Mode-locked Master Oscillator Power Amplifier System Based on eXtreme Chirped Pulse Amplification (X-CPA)", Optics Express, Jun. 2, 2005, pp. 4600-4606, vol. 13, No. 12.

Koechner, "Solid State Laser Engineering", Oct. 29, 1999, Section 5.5, pp. 270-277, 5th Edition, Springer.

Kwon, et al., "Tunable Dispersion Slope Compensator Using a Chirped Fiber Bragg Grating Tuned by a Fan-shaped Thin Metallic Heat Channel," IEEE Photonics Technology Letters, vol. 18, No. 1, pp. 118-120, Jan. 1, 2006.

Kyungbum, Kim et al., "1.4kW High Peak Power Generation from an all Semiconductor Mode-locked Master Oscillator Power Amplifier System Based on eXtreme Chirped Pulse Amplification (X-CPA)", Optics Express, Jun. 2, 2005, pp. 4600-4606, vol. 13, No. 12.

Levy et al., "Engineering Space-Variant Inhomogeneous Media for Polarization Control," Optics Letters, Aug. 1, 2004, pp. 1718-1720, vol. 29, No. 15, Optical Society of America.

Liao, K. et al.., "Large-aperture Chirped vol. Bragg Grating Based Fiber CPA System," Optics Express, Apr. 16, 2007, vol. 15, No. 8, pp. 4876-4882.

Lo, S. et al., "Semiconductor Hollow Optical Waveguides Formed by Omni-directional Reflectors", Optics Express, vol. 12, No. 26, Dec. 27, 2004, pp. 6589-6593.

Malinowski A. et al., "Short Pulse High Power Fiber Laser Systems," Proceedings of the 2005 Conference on Lasers and Electro-Optics (CLEO), Paper No. CThG3, pp. 1647-1649, May 26, 2005.

Mehier-Humbert, S. et al., "Physical Methods for Gene Transfer: Improving the Kinetics of Gene Delivery Into Cells," Advanced Drug Delivery Reviews, vol. 57, pp. 733-753, 2005.

Mohammed, W. et al., "Selective Excitation of the TE01 Mode in Hollow-Glass Waveguide Using a Subwavelength Grating," IEEE Photonics Technology Letters, Jul. 2005, vol. 17, No. 7, IEEE.

Nibbering, E.T.J., et al. "Spectral Determination of the Amplitude and the Phase of Intense Ultrashort Optical Pulses," Journal Optical Society of America B, vol. 13, No. 2, pp. 317-329, Feb. 1996.

Nicholson, J. et al., "Propagation of Femotsecond Pulses in Large-mode-area, Higher-order-mode Fiber," Optics Letters, vol. 31, No. 21, 2005, pp. 3191-3193.

Noda, J. et al., "Polarization-maintaining Fibers and Their Applications", Journal of Lightwave Technology, vol. Lt-4, No. 8 Aug. 1986, pp. 1071-1089.

Palfrey et al., "Generation of 16-FSEC Frequency-tunable Pulses by Optical Pulse compression" Optics Letters, OSA, Optical Society of america, Washington, DC, USA, vol. 10, No. 11, Nov. 1, 1985, pp. 562-564, XP000710358 ISSN: 0146-9592.

Pelusi, M. D. et al., "Electrooptic Phase Modulation of Stretched 250-fs Pulses for Suppression of Third-Order Fiber Disperson in Transmission," IEEE Photonics Technology Letters, vol. 11, No. 11, pp. 1461-1463, Nov. 1999.

Pelusi, M. D. et al., "Phase Modulation of Stretched Optical Pulses for Suppression of Third-order Dispersion Effects in fibre Transmission," Electronics Letters, vol. 34, No. 17, pp. 1675-1677, Aug. 20, 1998.

Price et al., "Advances in High Power, Short Pulse, Fiber Laser Systems and Technology", Proceedings of SPIE—vol. 5709, Fiber Lasers II: Technology, Systems, and Applications, Apr. 2005, pp. 184-192.

Price et al., "Advances in High Power, Short Pulse, Fiber Laser Systems and Technology", Photonics West 2005, San Jose, California, Jan. 2005, pp. 5709-3720.

Ramachandran, S., et al., "High-power Amplification in a 2040-pm2 Higher Order Mode," Spie Photonics West 2007, Post-deadline.

Resan et al., "Dispersion-Managed Semiconductor Mode-Locked Ring Laser", Optics Letters, Aug. 1, 2003, pp. 1371-1373, vol. 28, No. 15, Optical Society of America.

Schreiber, T., et al., "Design and High Power Operation of a Stress-induced single Polarization Single-transverse Mode Lma Yb-doped Photonic Crystal Fiber," Fiber Lasers III: Technology, Systems, and Applications, Andrew J.W. Brown, Johan Nilsson, Donald J. Harter, Andreas Tunnermann, eds., Proc. Of SPIE, vol. 6102, pp. 61020C-1-61020C-9, 2006.

Schreiber, T., et al., "Stress-induced Single-polarization Single-transverse Mode Photonic Crystal Fiber with Low Nonlinearity," Optics Express, vol. 13, No. 19, Sep. 19, 2005, pp. 7621-7630.

Siegman, "Unstable Optical Resonators", Applied Optics, Feb. 1974, pp. 353-367, vol. 13, No. 2.

Stevenson et al., Femtosecond Optical Transfection of Cells: Viability and Efficiency,Optics Express, vol. 14, No. 16, pp. 7125-7133, Aug. 7, 2006.

Tirlapur et al., "Targeted Transfection by Femtosecond Laser," Nature Publishing Group, vol. 418, pp. 290-291, Jul. 18, 2002.

Tsai et al., "Ultrashort Pulsed Laser Light," Optics & Photonics News, pp. 25-29, Jul. 2004.

Vaissie et al., "Desktop Ultra-Short Pulse Laser at 1552 nm,"Ultrashort Pulse Laser Materials Interaction Workshop (Raydiance)—Directed Energy Professional Society (DEPS), Sep. 28, 2006.

* cited by examiner

DISPERSION COMPENSATION IN A CHIRPED PULSE AMPLIFICATION SYSTEM

CROSS-REFERENCE TO RELATED APPLICATIONS

This application is a continuation-in-part of U.S. patent application Ser. No. 11/615,883, filed on Dec. 22, 2006 now U.S. Pat. No. 7,444,049 entitled "Pulse Stretcher and Compressor including a Multi-Pass Bragg Grating" which claims the benefit of each of the following U.S. Provisional Patent Applications: U.S. Provisional Patent Application Ser. No. 60/761,736, filed on Jan. 23, 2006, entitled "Method of Dispersion Compensation in a CPA System;" U.S. Provisional Patent Application Ser. No. 60/762,284, filed on Jan. 25, 2006, entitled "USP Laser Fiber Amplifier;" U.S. Provisional Patent Application Ser. No. 60/763,002, filed on Jan. 26, 2006, entitled "Seed Control in Ultra-Short Pulse Laser Systems;" U.S. Provisional Patent Application Ser. No. 60/762,791, filed on Jan. 26, 2006, entitled "Amplifier Control in Ultra-Short Pulse Laser Systems;" and U.S. Provisional Patent Application Ser. No. 60/762,790, filed on Jan. 26, 2006, entitled "Method of Remote Access to an Ultra-Short Pulse Laser System," all of which are incorporated by reference.

This application is related to co-pending U.S. patent application Ser. No. 11/112,256, filed Apr. 22, 2005, entitled "Bragg Fibers in Systems for the Generation of High Peak Power Light," which claims the benefit of U.S. Provisional Patent Application Ser. No. 60/635,734, filed on Dec. 13, 2004, and entitled "Bragg Fibers For The Generation Of High Peak Power Light," and U.S. Provisional Patent Application Ser. No. 60/636,376, filed on Dec. 16, 2004, and entitled "Bragg Fibers In Systems For The Generation Of High Peak Power Light;" and this application is also related to co-pending U.S. patent application Ser. No. 11/491,219, filed Jul. 20, 2006, entitled "High Order Mode Optical Amplifier in an Ultrashort Pulse Laser System," which in turn claims the benefit of U.S. Provisional Patent Application Ser. No. 60/793,960, filed Apr. 20, 2006, entitled "Chirped Pulse Amplifier System Including Tapered Fiber Bundle;" the disclosures of all of the above U.S. patent applications are incorporated by reference herein.

BACKGROUND OF THE INVENTION

1. Field of the Invention

The present invention relates to the field of laser technology, and more particularly to methods for generating high energy, ultra-short laser pulses.

2. Description of Related Art

Chirped pulse amplification (CPA) is very useful for producing ultra short-duration high-intensity pulses for use in high peak power ultra-short pulse laser systems. Material removal with such ultra-short pulses is especially useful for many purposes, as it is almost non-thermal and exerts essentially no pressure on the work surface. CPA increases the energy of an ultra-short laser pulse while avoiding optical amplifier damage. In this technique, the duration of the pulse is increased by first dispersing the ultra-short laser pulse temporally as a function of wavelength (a process called "chirping") to produce a chirped pulse, then amplifying the chirped pulse, and then recompressing the chirped pulse to significantly shorten its duration. Lengthening the pulse in time (i.e., "stretching" the pulse) reduces the peak power of the pulse and, thus, allows energy to be added to the pulse without reaching a damage threshold of the pulse amplifier and optical components. The amount of pulse amplification that can be achieved is typically proportional to the amount of pulse stretching and subsequent compression. Typically, the greater the amount of stretching and compression, the greater the possible pulse amplification.

A fiber Bragg grating may be used for chirping a pulse and recompressing the pulse. However, the amount of stretching or compression by the fiber Bragg grating is substantially fixed by the physical dimensions of the fiber Bragg grating. Thus, various sizes of fiber Bragg gratings are used for chirping and/or compressing pulses. In some fiber Bragg gratings, nominal adjustments to the pulse length may be provided by physically, mechanically, or thermally stretching the optical fiber of the fiber Bragg grating to modify the length of the optical fiber. Unfortunately, the amount of adjustment to the pulse length is relatively small and the optical fiber may suffer damage from the physical stress and strain of the stretching. There is, therefore, a need for improved systems and methods of stretching and compressing optical pulses.

As noted, to bring the amplified pulse back to an ultra-short pulse length, the amplified pulse must be compressed. Typically, compression is done with bulk optical elements involving prism and grating pairs. Pulse-compression techniques of amplified chirped pulses are discussed, for example, in U.S. Pat. No. 5,822,097 by Tournois. Compact grating compressors present high third order dispersion, also referred to as dispersion slope. Such high order dispersion is mismatched to the dispersion parameters of standard fiber stretchers and prevents compression of a pulse below a few picoseconds.

SUMMARY OF THE INVENTION

Various embodiments of the invention include a CPA system for amplifying a chirped pulse to a high power. The CPA system is configured to stretch and/or compress the pulse using multiple passes through a Bragg grating. In various embodiments, the Bragg grating includes a fiber Bragg grating, a volume Bragg grating, a bulk grating, a chirped fiber Bragg grating (CFBG), a chirped volume Bragg grating (CVBG), a Gires-Tournois Interferometer (GTI) in planar waveguide, a Fabry-Perot GTI, and/or the like. As used in this application, the term Bragg grating is intended to further include a Bragg waveguide. In various embodiments, a Bragg waveguide may comprise a Bragg fiber, a fiber Bragg grating, and/or the like. Bragg fibers are characterized in U.S. patent application entitled "Bragg Fibers in Systems for the Generation of High Peak Power Light," Ser. No. 11/112,256, filed Apr. 22, 2005.

The multiple passes of the pulse through the Bragg grating enable stretching and/or compression of the pulse multiple times. The number of passes through the Bragg grating determines the amount of stretching and/or compression of the pulse. For example, a pulse can be stretched by a greater amount using multiple passes than using a single pass. Likewise, the pulse can be compressed by a greater amount using multiple passes than using a single pass. The number of passes may be selected to control the amount of stretching and/or compression.

Beam steering optics may be configured for directing the pulse through the Bragg grating multiple times. For example, the beam steering optics may direct the pulse through multiple paths within a volume Bragg grating. In some embodiments, the beam steering optics includes a switch configured to control the number of times a pulse passes through a Bragg grating. In some embodiments, a pulse may traverse multiple Bragg gratings, each multiple times. In some embodiments, a volume Bragg grating is configured to both stretch and compress a pulse multiple times, using beam steering optics to direct the pulse through appropriate paths. In some embodiments, the pulse is amplified between passes through the Bragg grating. In various embodiments, the Bragg grating, beam steering optic components, amplifiers, delay lines, switches, and/or the like may be mounted and/or fabricated on a wafer.

Various embodiments of the invention include a laser system comprising a source configured to emit a pulse, a Bragg grating configured to receive the pulse and compress the pulse to generate a compressed pulse, and beam steering optics configured to direct the compressed pulse into the Bragg grating one or more times to further compress the compressed pulse.

Various embodiments of the invention include a laser system comprising a source configured to emit a pulse, a Bragg grating configured to receive the pulse and stretch the pulse to generate a stretched pulse, and beam steering optics configured to direct the stretched pulse into the Bragg grating one or more times to further stretch the stretched pulse.

Various embodiments of the invention include a system comprising a volume Bragg grating configured to receive a pulse, and beam steering optics configured to direct the pulse into the volume Bragg grating two or more times, each of the two or more times being to compress the pulse, or direct the pulse into the volume Bragg grating two or more times, each of the two or more times being to stretch the pulse.

Various embodiments of the invention include a system comprising a Bragg grating configured to receive a pulse and output a compressed or stretched pulse, and a switch configured to receive the compressed or stretched pulse from the Bragg grating and, in a first state, to direct the compressed or stretched pulse one or more times into the Bragg grating for further compression or stretching to produce a multiply-stretched or multiply-compressed pulse and, in a second state, to direct the multiply-compressed or multiply-stretched pulse as an output pulse.

Various embodiments of the invention include a method comprising receiving a pulse in a Bragg grating, compressing the pulse using the Bragg grating to generate a compressed pulse, directing the compressed pulse into the Bragg grating, and further compressing the compressed pulse one or more times using the Bragg grating to generate a multiply-compressed pulse.

Various embodiments of the invention include a method comprising receiving a pulse in a Bragg grating, stretching the pulse using the Bragg grating to generate a stretched pulse, directing the stretched pulse into the Bragg grating, and further stretching the stretched pulse one or more times using the Bragg grating to generate a multiply-stretched pulse.

Various embodiments of the invention include a method comprising receiving a pulse in a first Bragg grating, stretching the pulse using the first Bragg grating two or more times to generate a multiply-stretched pulse, amplifying the multiply-stretched pulse to generate an amplified pulse, and compressing the amplified pulse two or more times using a second Bragg grating.

The present invention also provides a laser system comprising a source configured to emit an optical pulse and a polarization-maintaining fiber including a nonlinear Bragg grating configured to receive the optical pulse and produce a dispersion-compensated optical pulse. The exemplary laser system also comprises a power amplifier configured to receive the dispersion-compensated optical pulse and produce an amplified optical pulse, and a compressor configured to receive and compress the amplified optical pulse.

In some embodiments the polarization-maintaining fiber including the nonlinear Bragg grating serves to stretch the optical pulse. In other embodiments, the laser system includes a separate pulse stretcher disposed between the source and the power amplifier, either between the polarization-maintaining fiber and the power amplifier or between the source and the polarization-maintaining fiber.

The nonlinear Bragg grating in the polarization-maintaining fiber can be configured to provide third-order compensation to the optical pulse In some of these embodiments the nonlinear Bragg grating in the polarization-maintaining fiber is configured to provide essentially no fourth-order compensation to the optical pulse. The nonlinear Bragg grating in the polarization-maintaining fiber can include sloped bandwidth edges, or apodized edges, in some embodiments. The nonlinear Bragg grating in the polarization-maintaining fiber can also include an approximately-parabolic reflectivity profile. In some embodiments, the compressor is characterized by a positive dispersion that is less than a dispersion of the polarization-maintaining fiber including the nonlinear Bragg grating.

The exemplary laser system can also comprise a polarization-maintaining fiber circulator configured to circulate the optical pulse through the polarization-maintaining fiber including the nonlinear Bragg grating. The exemplary laser system can further comprise a length of polarization-maintaining fiber configured to receive the amplified optical pulse from the power amplifier. The length of polarization-maintaining fiber is configured to provide, in some embodiments, quadratic dispersion less than 5% of the quadratic dispersion of the compressor.

Methods for generating ultra-short optical pulses are also provided. An exemplary method comprises generating an optical pulse, stretching the optical pulse to produce a stretched optical pulse, producing a dispersion-compensated optical pulse by passing the stretched optical pulse through a polarization-maintaining fiber including a nonlinear Bragg grating, producing an amplified optical pulse from the dispersion-compensated optical pulse, and compressing the amplified optical pulse.

Another exemplary method comprises generating an optical pulse, producing a dispersion-compensated optical pulse by passing the optical pulse through a polarization-maintaining fiber including a nonlinear Bragg grating, stretching the dispersion-compensated optical pulse to produce a stretched optical pulse, producing an amplified optical pulse from the stretched optical pulse, and compressing the amplified optical pulse.

Yet another exemplary method comprises generating an optical pulse, producing a stretched and dispersion-compensated optical pulse by passing the optical pulse through a polarization-maintaining fiber including a nonlinear Bragg grating, producing an amplified optical pulse from the stretched and dispersion-compensated optical pulse, and compressing the amplified optical pulse.

In any of the three exemplary methods just described, the method can further comprise circulating the dispersion-compensated optical pulse, or the stretched and dispersion-compensated optical pulse, through the polarization-maintaining fiber including the nonlinear Bragg grating. Likewise, any of the three exemplary methods can further comprise passing the amplified optical pulse through a length of polarization-maintaining fiber before compressing the amplified optical pulse.

DETAILED DESCRIPTION

The specification provides systems and methods of dispersion compensation in high-power, ultra-short pulse systems to allow, for example, sub-picosecond pulses to be generated. The systems and methods involve the use of nonlinear optical chirped fiber Bragg gratings (CFBG) to provide dispersion compensation. Here, the nonlinear optical fiber Bragg gratings are formed in polarization maintaining (PM) fibers. High-power, ultra-short pulse systems and methods of modifying pulses are first discussed, followed by a discussion of the incorporation of nonlinear optical fiber Bragg gratings commencing with FIG. 11.

Figure 1A:
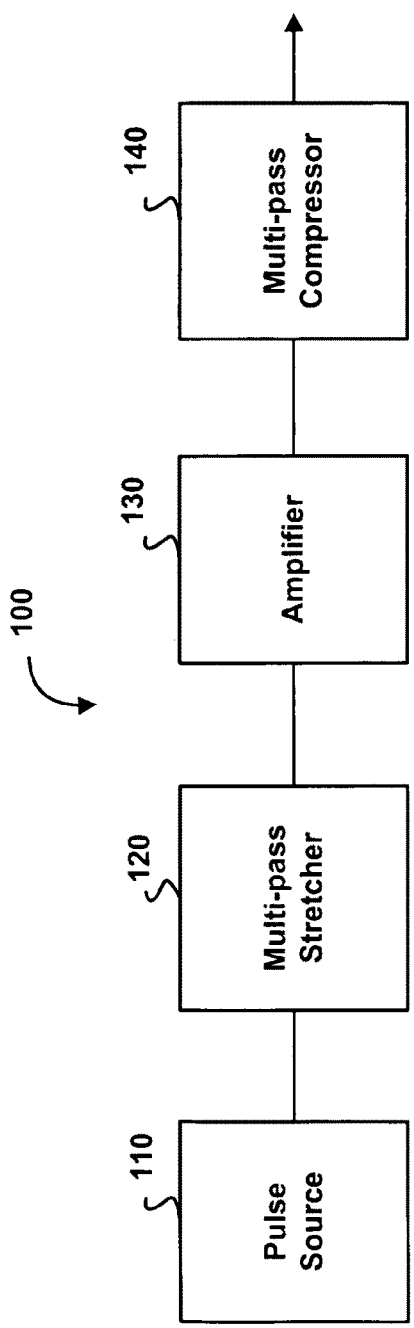
FIG. 1A is a block diagram illustrating various embodiments of a chirped pulse amplification system.

FIG. 1A is a block diagram illustrating various embodiments of a chirped pulse amplification system generally designated 100. The chirped pulse amplification system 100 includes a pulse source 110, an optional multi-pass stretcher 120, an amplifier 130, and an optional multi-pass compressor 140. The pulse source 110 is configured to generate a pulse having a duration, amplitude, mode, and phase profile. In various embodiments, the pulse source 110 comprises, for example, a ring laser, a laser oscillator, a chirped pulse source, a quasi-continuous wave laser, or the like. In some embodiments, the pulse source 100 generates a chirped pulse. In these embodiments, the multi-pass stretcher 120 is optional. The chirped pulse amplification system 100 includes at least one of the multi-pass stretcher 120 and the multi-pass compressor 140. For example, in some embodiments the multi-pass stretcher 120 is replaced by a single-pass stretcher of the prior art. These embodiments include the multi-pass compressor 140.

The multi-pass stretcher 120 is configured to receive the pulse from the pulse source 110 and includes one or more Bragg gratings through which the pulse is directed one or more times. In various embodiments, the pulse traverses at least one Bragg grating multiple times, and may pass through multiple Bragg gratings one or more times each.

The Bragg grating may be fabricated using a photorefractive glass that has an altered refractive index in areas that have been exposed to UV light. The areas of altered refractive index may be arranged so as to stretch and/or compress a pulse. Optionally, the path of the pulse through the Bragg grating determines whether the pulse is stretched or compressed. In some embodiments the Bragg grating is a chirped volume Bragg grating (CVBG) configured to stretch (or chirp) a pulse.

The volume Bragg grating optionally includes a cross-sectional aspect ratio in which one dimension is significantly larger than another dimension. For example, the volume Bragg grating may have a cross-sectional height of microns and a cross sectional width on the order of one or more millimeters. In these embodiments, the volume Bragg grating may act as a single mode waveguide in one dimension and as a bulk optic in another dimension. In various embodiments, the cross-sectional dimensions may be in ratios of at least 1:1, 1:5, 1:10, 1:50, 1:100, 1:500, 1:1000, 1:5000, and 1:10,000. Embodiments with aspect ratios greater than 1:1 may be particularly suited for fabrication on a wafer.

The amplifier 130 is configured to receive the stretched pulse from the multi-pass stretcher 120 and amplify the pulse. In some embodiments, the amplifier 130 is configured to amplify the pulse between passes through a Bragg grating of the multi-pass stretcher 120. In various embodiments, the amplifier 130 includes a doped fiber amplifier, a semiconductor optical amplifier, a double-clad fiber amplifier, a photonic crystal fiber amplifier, Raman amplifier, and/or the like. In some embodiments, the amplifier 130 comprises a tapered fiber bundle amplifier. Further details of an amplifier including a tapered fiber bundle may be found within U.S. Provisional Patent Application serial number 60/793,960, entitled "Chirped. Pulse Amplifier System Including Tapered Fiber Bundle." In some embodiments, the amplifier comprises a high order mode fiber amplifier such as that described in U.S. patent application Ser. No. 11/491,219, entitled "High Order Mode Optical Amplifier in an Ultrashort Pulse Laser System."

The multi-pass compressor 140 is configured to receive the amplified pulse from the amplifier 130 and includes one or more Bragg gratings configured to receive the amplified pulse one or more times. In various embodiments, the amplified pulse traverses at least one Bragg grating multiple times, and may pass through multiple Bragg gratings one or more times each. The temporal dispersion caused by the Bragg grating may be controlled by stretching the Bragg grating using a mechanical stretcher or a temperature controller. For example, if the Bragg grating is a volume Bragg grating its dispersion properties may be controlled by heating or cooling the volume Bragg grating. In some embodiments, the multi-pass compressor 140 is replaced by a single-pass compressor of the prior art. These embodiments include the multi-pass stretcher 120.

Figure 1B:
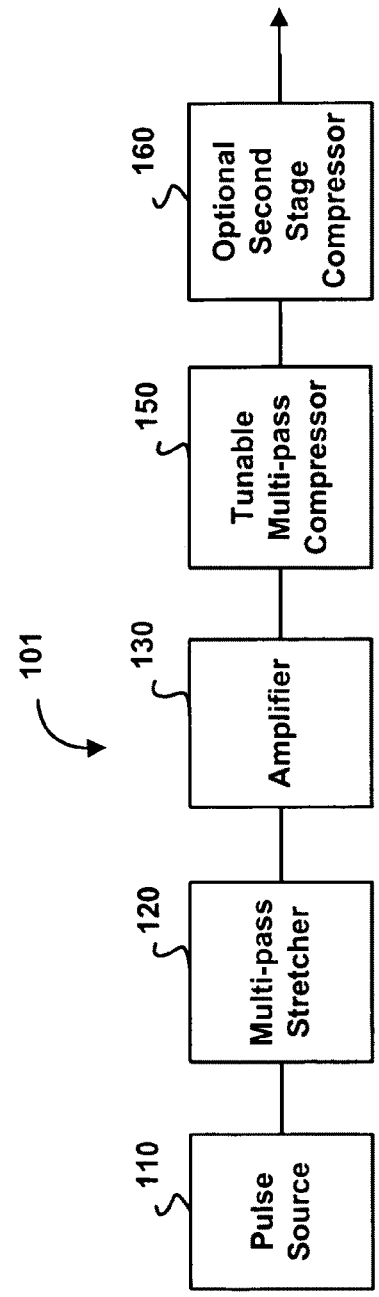
FIG. 1B is a block diagram illustrating various embodiments of a chirped pulse amplification system including a tunable multi-pass compressor.

FIG. 1B is a block diagram illustrating various embodiments of a chirped pulse amplification system generally designated 101 and including a tunable multi-pass compressor. The chirped pulse amplification system 101 in FIG. 1B differs from the chirped pulse amplification system 100 in FIG. 1A in that the chirped pulse amplification system 101 includes a tunable multi-pass compressor 150 and/or an optional second stage compressor 160. The chirped pulse amplification system 101 is an alternative embodiment of the chirped pulse amplification system 100. The tunable multi-pass compressor 150 and/or an optional second stage compressor 160 represent alternative embodiments of the multi-pass compressor 140. The tunable multi-pass compressor 150 is configured to be tuned by controlling the number of passes of the pulse through a Bragg grating, and thus, controlling the output pulse width. In some embodiments, the tunable multi-pass compressor 150 is configured to provide fine control of the pulse width and the second stage compressor 160 is configured to provide coarse compression. In various embodiments, the second stage compressor 160 includes a single pass compressor or a multi-pass compressor. The second stage compressor 160 optionally includes a Bragg grating (e.g., a fiber Bragg grating or a Bragg waveguide). In some embodiments, the chirped pulse amplification system 101 is configured such that the second stage compressor 160 receives a pulse from the amplifier 130 and the output of the second stage compressor 160 is received by the tunable multi-pass compressor 150. In these embodiments, the pulse may be substantially compressed prior to being received by the tunable multi-pass compressor 150.

Figure 2:
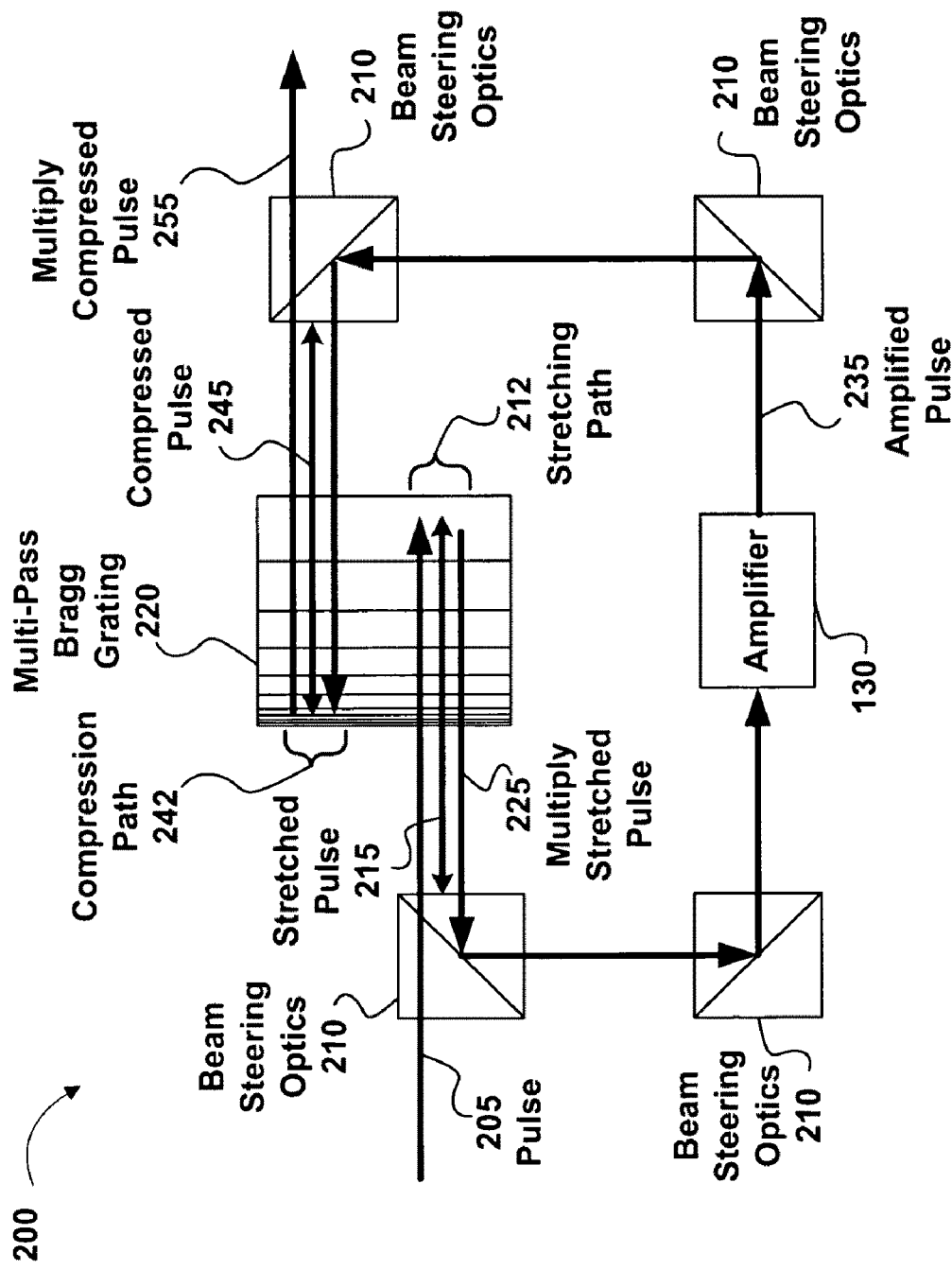
FIG. 2 is a block diagram illustrating a chirped pulse amplifier including a multi-pass Bragg grating in which the pulse is both stretched and compressed, according to various embodiments.

FIG. 2 is a block diagram illustrating part of chirped pulse amplification system 100, according to various embodiments. These embodiments include a multi-pass Bragg grating in which the pulse is both stretched and compressed. In FIG. 2, a chirped pulse amplifier includes a single Bragg grating which is used for both stretching a pulse using multiple passes and for compressing a pulse using multiple passes. The path of the pulse through a multi-pass Bragg grating determines whether the pulse is stretched or compressed. The pulse may be directed through a multi-pass stretching path in the Bragg grating for stretching the pulse. Further, the pulse may be directed through a multi-pass compression path in the same Bragg grating resulting in compression of the pulse.

The embodiments illustrated in FIG. 2 include a chirped pulse amplifier 200 including a multi-pass Bragg grating 220 in which the pulse is both stretched and compressed, according to various embodiments. The chirped pulse amplifier 200 includes embodiments of the multi-pass stretcher 120, the amplifier 130 and the multi-pass compressor 140. Specifically, the chirped pulse amplifier 200 includes beam steering optic components 210, a multi-pass Bragg grating 220, and the amplifier 130. The multi-pass Bragg grating 220 may be part of both the multi-pass stretcher 120 and multi-pass compressor 140.

In the chirped pulse amplifier 200, a pulse 205, from pulse source 110, is directed through a stretching path 212 in the multi-pass Bragg grating 220 using one or more beam steering optics 210. In various embodiments, the beam steering optics 210 include beam splitters, optical fibers, phase rotators, prisms, reflectors, lenses, tapered fiber bundles, Bragg waveguides, optical combiners, and/or the like. The multi-pass Bragg grating 220 is configured to receive the pulse 205 and output a stretched pulse 215. The beam steering optics 210 are configured to further direct the stretched pulse 215 again into the stretching path 212 in the multi-pass Bragg grating 220 for additional stretching. After being stretched two or more times the multi-pass Bragg grating 220 outputs the stretched pulse 215 as a multiply-stretched pulse 225.

The multiply-stretched pulse 225 may be directed using one or more beam steering optics 210 to the amplifier 130. The amplifier 130 is configured to amplify the multiply-stretched pulse 225 and output an amplified pulse 235, as described elsewhere herein. The amplified pulse 235 may be directed, using beam steering optics 210, to the multi-pass Bragg grating 220 for compression.

The beam steering optics 210 are further configured to direct the amplified pulse 235 into a compression path 242 in the multi-pass Bragg grating 220 for generating a compressed pulse 245, and to direct the compressed pulse 245 again into the compression path 242 in the multi-pass Bragg grating 220 for additional compression. After being compressed two or more times the compressed pulse 245 is output as a multiply-compressed pulse 255.

In FIG. 2, the pulse 205, the stretching path 212 and the compression path 242 are depicted as spatially offset for purposes of illustration. However, a practitioner with ordinary skill in the art will recognize that in some embodiments, there may not be a spatial offset between the stretching path 212 and the compression path 242 and that they may overlap within the multi-pass Bragg grating 220. In various embodiments, the multi-pass Bragg grating 220, the amplifier 130, the pulse source 110, and/or the one or more of the beam steering optics 210 may be mounted and/or fabricated on a wafer.

Figure 3:
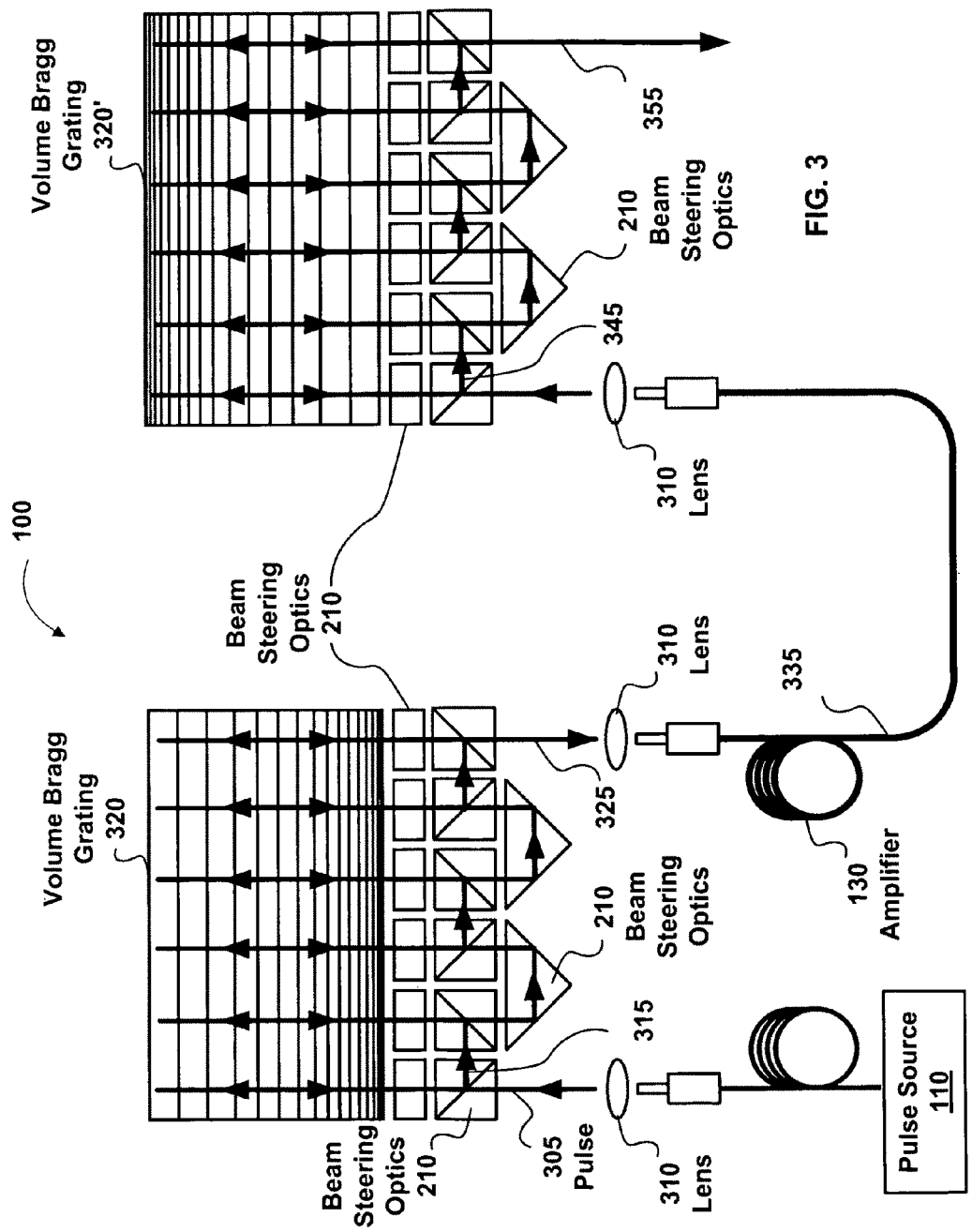
FIG. 3 is a block diagram of alternative embodiments of the chirped pulse amplifier of FIG. 1A, illustrating details of a multi-pass stretcher and a multi-pass compressor.

FIG. 3 is a block diagram of alternative embodiments of the chirped pulse amplifier of FIG. 1A, illustrating details of a multi-pass stretcher and a multi-pass compressor. In these embodiments, beam steering optics are used for directing a pulse through multiple paths within volume Bragg gratings to stretch and/or compress the pulse. In some embodiments, the multiple paths through a volume Bragg grating may be separated in space using the beam steering optics.

In the embodiment illustrated in FIG. 3, the multi-pass stretcher 120 includes an optional lens 310, beam steering optics 210, and an optional first volume Bragg grating 320 configured to stretch a pulse 305 multiple times. The multi-pass compressor 140 includes an optional lens(es) 310, beam steering optics 210 and a second optional volume Bragg grating 320' configured to compress an amplified pulse 335 multiple times. The pulse source 110 is configured to provide a pulse 305. The lens 310 may be used to configure the pulse 305 to converge or diverge. The pulse 305 may be directed to the first volume Bragg grating 320 using one or more beam steering optics 210. The first volume Bragg grating 320 is configured to receive the pulse 305 from the pulse source 110 and output a stretched pulse 315. The stretched pulse 315 may be directed, using the beam steering optics 210, into the first volume Bragg grating 320 again for additional stretching. The stretched pulse 315 may be further stretched one or more times in the first volume Bragg grating 320 and output as a multiply-stretched pulse 325.

The multiply-stretched pulse 325 may be directed using one or more beam steering optics 210 to the amplifier 130.

The amplifier 130 is configured to amplify the multiply-stretched pulse 325 and output an amplified pulse 335. The amplified pulse 335 may be directed, using beam steering optics 210 and/or a lens(es) 310, to the second volume Bragg grating 320'.

The second volume Bragg grating 320' is configured to receive the amplified pulse 335 from the amplifier 130 and output a compressed pulse 345. The compressed pulse 345 may be directed, using one or more beam steering optics 210, into the second volume Bragg grating 320' again for additional compression. The compressed pulse 345 may be further compressed one or more times in the second multi-pass Bragg Grating 320' and output as a multiply-compressed pulse 355.

In various embodiments, the volume Bragg gratings 320 and/or 320', the amplifier 130, pulse source 110, one or more lenses 310, and/or the one or more of the beam steering optics 210 may be mounted and/or fabricated on a wafer.

The volume Bragg gratings 320 and 320' are illustrated in FIG. 3 as single gratings. However, the volume Bragg gratings 320 and/or 320' may be configured as multiple gratings configured to receive one or more passes of a pulse. In some embodiments, at least one of the volume. Bragg gratings 320 and/or 320' is configured to receive two or more passes of a pulse.

Figure 4:
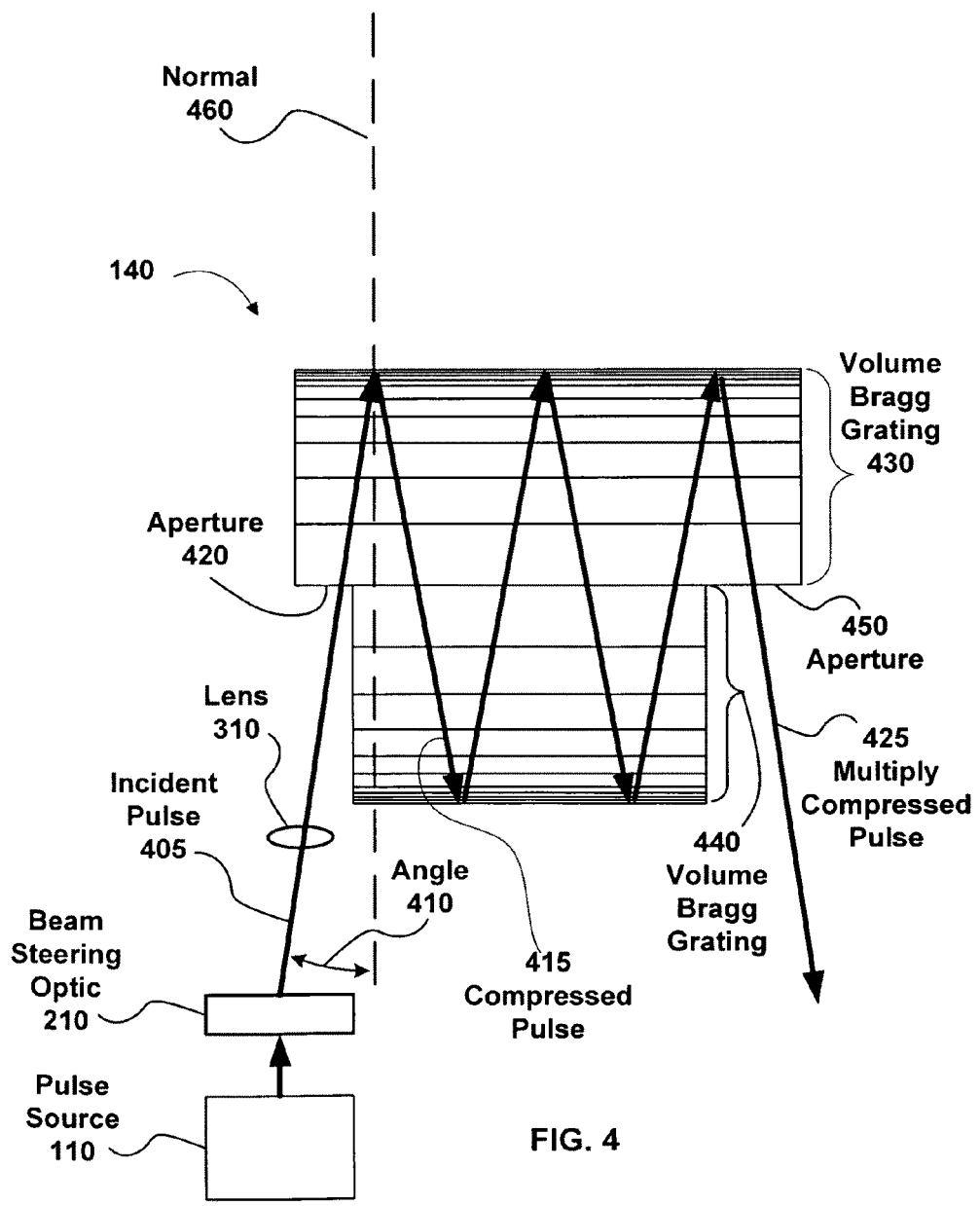
FIG. 4 is a block diagram illustrating further details of the multi-pass compressor of FIG. 1A, according to various embodiments including a multi-pass Bragg grating.

FIG. 4 is a block diagram illustrating further details of the multi-pass compressor 140 of FIG. 1A, according to various embodiments including a multi-pass Bragg grating. In these embodiments, a pulse is received by a volume Bragg grating at an incident angle configured such that the pulse passes through a path including multiple reflections along the interior of the volume Bragg grating. The number of reflections may be determined from the incident angle of the pulse and the width of the volume Bragg grating. A lens may be disposed in the path of the incident pulse and configured to provide for conditioning the pulse (e.g., adjusting convergence or divergence of the pulse).

In the embodiments illustrated by FIG. 4, the multi-pass compressor 140 includes beam steering optics 210, an optional lens 310, a volume Bragg grating 430, and an optional volume Bragg grating 440. The pulse source 110 is configured to emit an incident pulse 405 and the beam steering optics 210 are configured to direct the incident pulse 405 toward the volume Bragg grating 430 at an incident angle 410 with respect to a normal 460 to a plane of the volume Bragg grating 430. An optional lens 310 is configured to provide for divergence or convergence of the incident pulse 405.

The incident pulse 405 enters the volume Bragg grating 430 through an aperture 420. In some embodiments, the aperture 420 is normal to the incident pulse 405. In the volume Bragg grating 430, the incident pulse 405 is compressed to generate a compressed pulse 415. The optional volume Bragg grating 440 is configured to both further compress the compressed pulse 415 and to reflect the compressed pulse 415 into the volume Bragg grating 430 for additional compression. The compressed pulse 415 may undergo multiple reflections within the volume Bragg gratings 430 and 440, through an appropriate angle 410. With each reflection, the compressed pulse 415 is further compressed. The compressed pulse 415 may be emitted as a multiply-compressed pulse 425 from the volume Bragg grating 430 at an aperture 450.

The number of reflections within the volume Bragg grating 430 may be dependent on the length of the volume Bragg grating 430 and/or the volume Bragg grating 440. A greater length will result in a greater number of reflections. In some embodiments, the volume Bragg grating 430 and the volume Bragg grating 440 may be configured to emit the multiply-compressed pulse 425 from the volume Bragg grating 440 instead of 430. Thus, the length of the volume Bragg gratings 430 and/or 440 may be used to control the number of reflections.

The number of reflections within the volume Bragg grating 430 may also be dependent on the angle 410. A smaller angle 410 may result in a greater number of reflections. Thus, the number of the reflections of the compressed pulse 415, and therefore the width of the output pulse, may be tuned by adjusting the incident angle 410.

In some embodiments, a reflector is disposed in place of the volume Bragg grating 440. These embodiments optionally include a movable embodiment of aperture 450 disposed within the reflector. The number of reflections that a pulse experiences may be controlled by positioning the aperture 450. For example, the aperture 450 may be positioned such that the compressed pulse 415 is reflected nine times before reaching the aperture 450, or the aperture 450 may be positioned such that the compressed pulse 415 is reflected eleven times before reaching the aperture 450. In one embodiment, the aperture 450 is movable to select between one and thirty-five reflections. Thus, the number of reflections, and the amount of compression, can be controlled by positioning the aperture 450.

In FIG. 4, the volume Bragg gratings 430 and 440, as illustrated, are configured to compress the incident pulse 405. However, as one of ordinary skill in the art will recognize, the volume Bragg gratings 430 and 440 may be configured to stretch the pulse 405. In various embodiments, the volume Bragg grating 430 and/or 440, the lens 310, the beam steering optics 210, and/or the pulse source 110 may be mounted and/or fabricated on a wafer.

As illustrated in FIGS. 3 and 4, multiple passes within a Bragg grating may be accomplished by directing a pulse through multiple paths that are spatially separated, to stretch or compress the pulse. However, in some embodiments, the multiple paths through the Bragg grating may be separated in time instead of position. As illustrated in FIGS. 5A-5D, and 6, the separation in time of the multiple paths through the Bragg grating may be accomplished using a switch. Moreover, the switch may be used to select the number of passes through the Bragg grating, thus, determining the width of the stretched or compressed pulse. In various embodiments, a switch can be an optical switch, such as an acousto-optic modulator (AOM) switch, an electro-optic modulator (EOM) switch, or a 2×2 switch, or a mechanical switch such as a movable micro mirror, and/or the like.

Figure 5A:
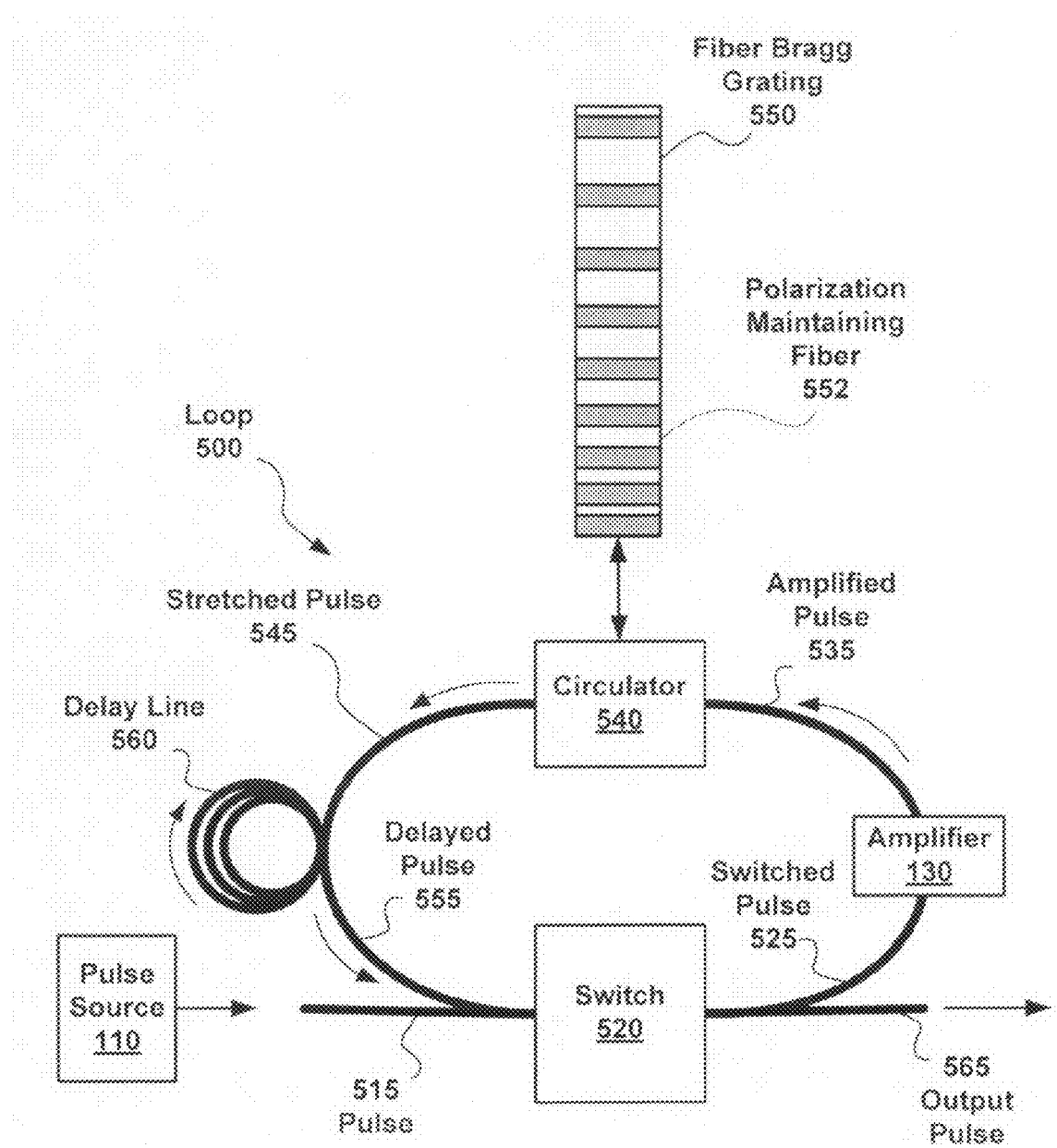
FIG. 5A is a block diagram illustrating further details of the multi-pass stretcher of FIG. 1A, according to various embodiments including a multi-pass loop.

FIG. 5A is a block diagram illustrating further details of the multi-pass stretcher 120 of FIG. 1A, according to various embodiments including a multi-pass loop 500. The loop 500 includes a switch 520, a circulator 540, a fiber Bragg grating 550, and an optional delay line 560. In some embodiments, the amplifier 130 is included within loop 500. In other embodiments, the amplifier 130 is separate from loop 500. The switch 520 is configured to receive a pulse 515 from the pulse source 110 and direct a switched pulse 525 to the amplifier 130. The amplifier 130 may be configured to receive the switched pulse 525 and output an amplified pulse 535. The amplified pulse 535 may be directed to the circulator 540. In some embodiments, the fiber Bragg grating 550 comprises a nonlinear Bragg grating formed in a polarization-maintaining ("PM") fiber 552, as described in more detail below.

The circulator 540 is configured to direct the amplified pulse 535 into the fiber Bragg grating 550 or other Bragg grating. The fiber Bragg grating 550 is configured to receive the amplified pulse 535 from the circulator 540 and return a stretched pulse 545 to the circulator 540. The circulator 540 is further configured to direct the stretched pulse 545 to the delay line 560. The delay line 560 is configured to output a delayed pulse 555 to the switch 520.

The same pulse can be directed around the loop 500 (i.e., from the switch 520, through the amplifier 130, the circulator 540, the fiber Bragg grating 550, and the delay line 560) multiple times. For example, a delayed pulse received at the switch 520 can be directed again to the circulator 540. In each pass through the elements in the loop 500, the pulse is again (optionally) amplified by the amplifier 130, and further stretched as a result of being directed into and out of the fiber Bragg grating 550.

After one or more passes through the loop 500, the state of the switch 520 may be changed such that the delayed pulse 555 is directed as an output pulse 565, rather than towards the amplifier 130 and/or circulator 540. Thus, the switch 520 may be used to control the number of times the pulse is directed through the loop 500. In various embodiments, the switch 520 includes a counter, a timer, a sensor, and/or the like. The counter may be configured to count the number of times the stretched pulse is direct into the fiber Bragg grating 550. The timer may be used to measure a delay time between changes in the state of the switch 520. The amount of stretching applied to the pulse, and thus, the pulse width, can be tuned by controlling the number of times the pulse is directed through the elements in the loop 500. Thus, the output pulse width of the loop 500 may be tuned by opening or closing the switch 520 at appropriate times. For example, in some embodiments, the loop 500 is designed to stretch the pulse using from one to one hundred passes, such that the width of the output pulse 565 may be tunable to one hundred different pulse widths. The loop 500 may be configured for selection of more or fewer than one hundred passes.

In various embodiments, the loop 500 may be used to stretch the pulse at least 1, 2, 10, 30, 100, or more times. In some embodiments, the pulse is attenuated, for example two percent, with each pass through the loop 500. When the attenuation is two percent per pass, the pulse will be attenuated about fifty percent after thirty-four passes. However, the pulse may be amplified between passes, for example, using the amplifier 130, to compensate, or more than compensate, for the attenuation.

In various embodiments, the pulses 515, 525, 535, 545, and/or 555 may be communicated between the switch 520, the amplifier 130, the circulator 540, the fiber Bragg grating 550, and/or the delay line 560 using beam steering optics described elsewhere herein. For example, a fiber optic, a high order mode fiber optic, and/or a tapered fiber bundle may be used to direct a pulse between any elements of the loop 500 (e.g., the switch 520 and the amplifier 130, the amplifier 130 and the circulator 540, the circulator 540 and the fiber Bragg grating 550, the circulator 540 and the delay line 560, and/or the delay line 560 and the switch 520).

Figure 5B:
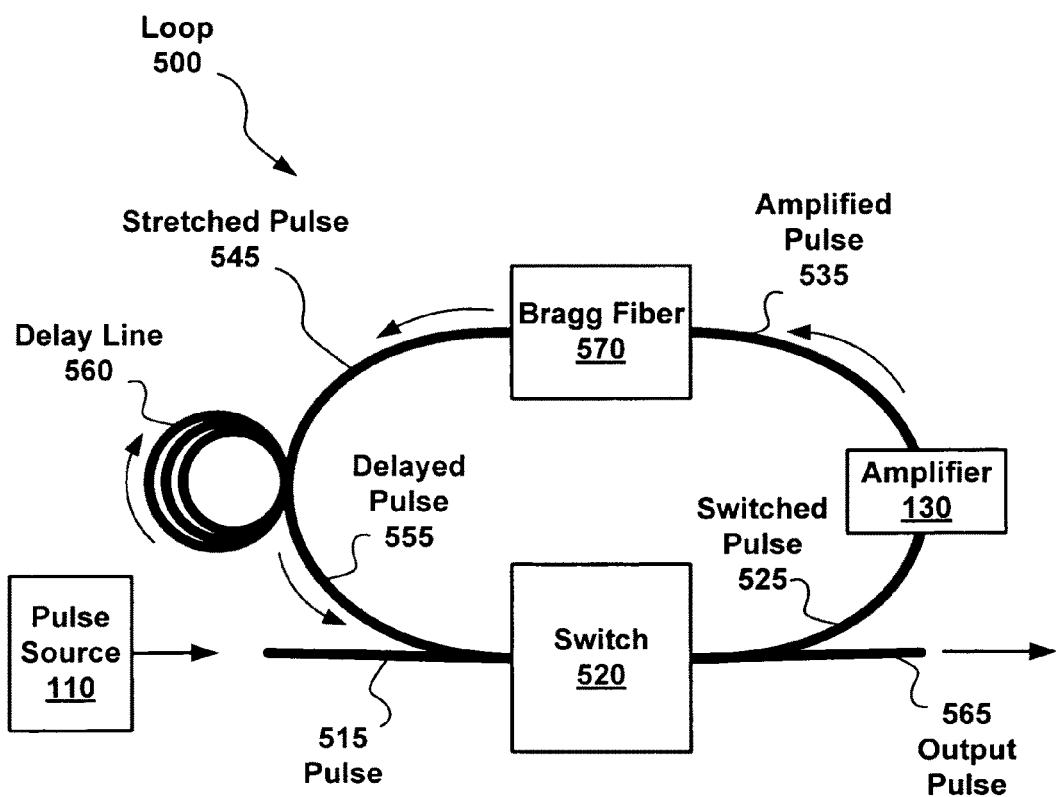
FIG. 5B is a block diagram illustrating further details of the multi-pass stretcher of FIG. 1A, according to various embodiments including a Bragg waveguide.

FIG. 5B is a block diagram illustrating further details of the multi-pass stretcher of FIG. 1A, according to various embodiments including a Bragg waveguide 570. FIG. 5B differs from FIG. 5A in that a Bragg waveguide 570 is used to stretch the pulse, instead of the circulator 540 and the fiber Bragg grating 550. In each pass through the elements in the loop 500, the pulse is further stretched as a result of passing through the Bragg waveguide 570, instead of being directed into the fiber Bragg grating 550 by the circulator 540.

Figure 5C:
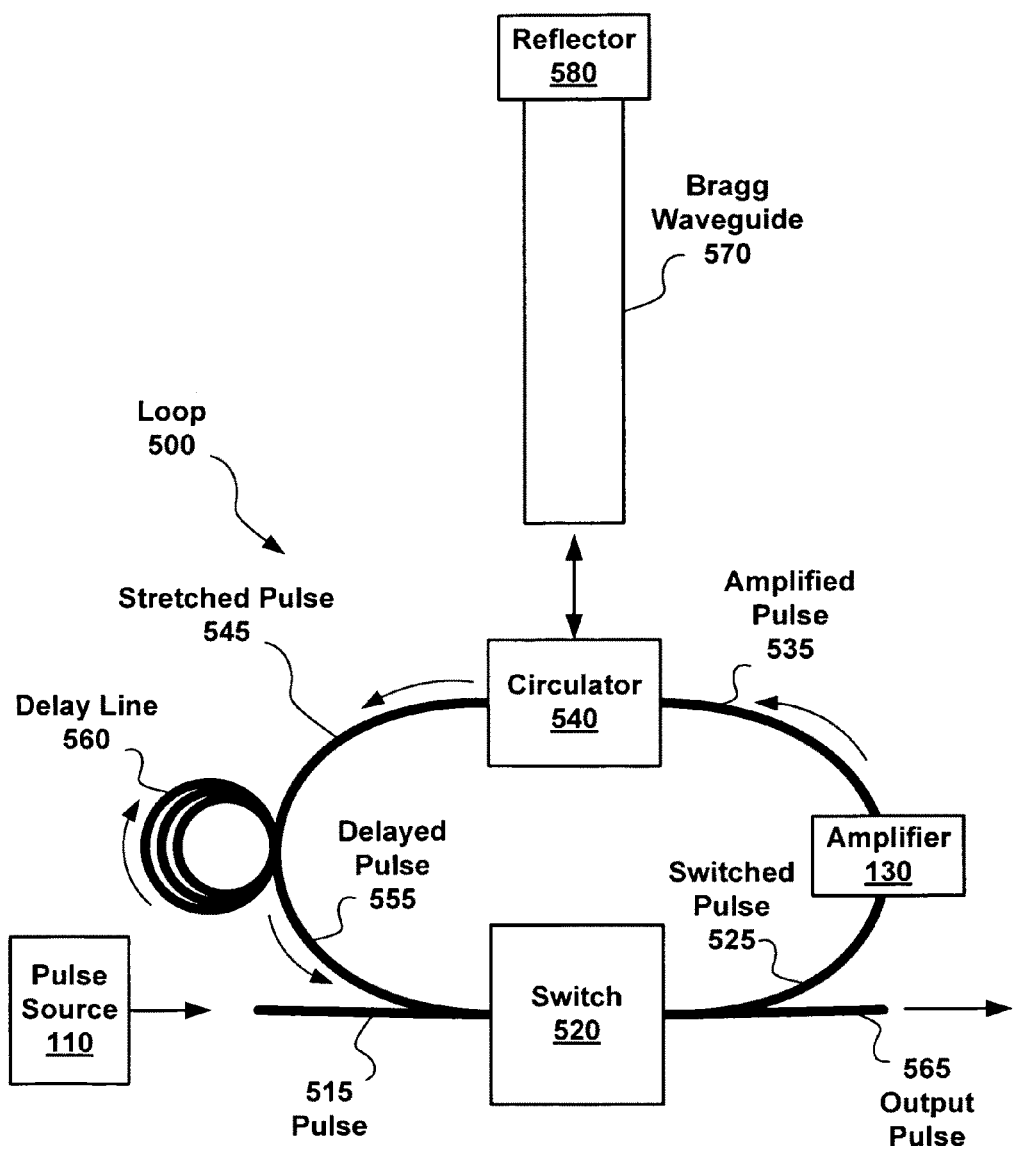
FIG. 5C is a block diagram illustrating further details of the multi-pass stretcher of FIG. 1A, according to various embodiments including a Bragg waveguide and a reflector.

FIG. 5C is a block diagram illustrating further details of the multi-pass stretcher of FIG. 1A, according to various embodiments including a Bragg waveguide 570 and a reflector 580. FIG. 5C differs from FIG. 5A in that a Bragg waveguide 570 and a reflector 580 is used to stretch the pulse, instead of the fiber Bragg grating 550. In each pass through the elements in the loop 500, the pulse is further stretched as a result of being directed into the Bragg waveguide 570 by the circulator 540. The reflector 580 may return the pulse back through the Bragg waveguide 570 to the circulator 540.

In FIGS. 5A-5C, the fiber Bragg grating 550 and Bragg waveguide are configured to stretch a pulse. However, one of ordinary skill in the art will recognize that the fiber Bragg grating 550 may be configured to compress a pulse. Moreover, the pulse may be compressed multiple times in one Bragg grating for fine adjustment and compressed a large amount one time in another Bragg grating for a coarse adjustment. Embodiments of the loop 500 that are configured to compress a pulse typically do not include the amplifier 130.

Figure 5D:
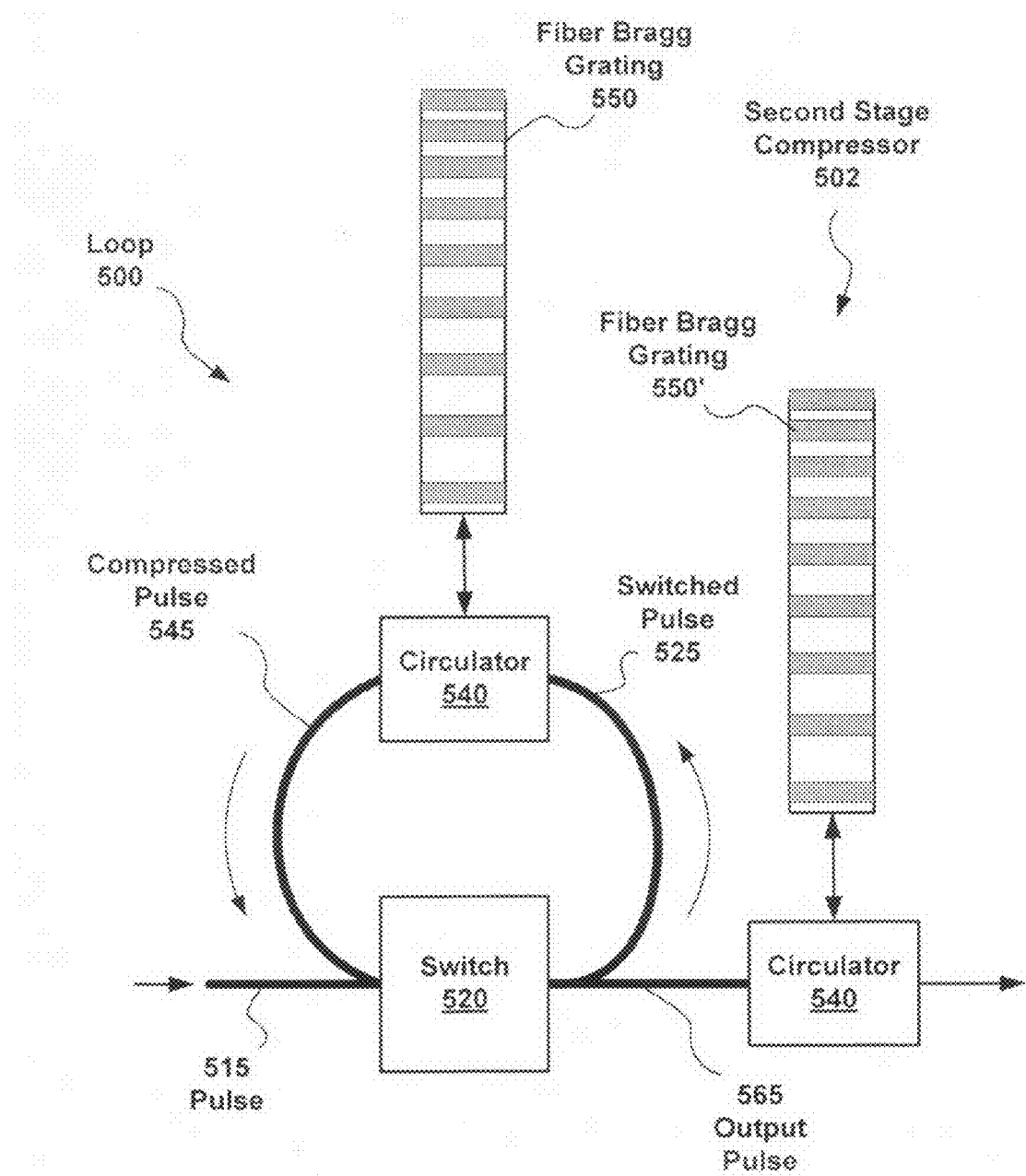
FIG. 5D is a block diagram illustrating further details of the multi-pass stretcher of FIG. 1A, according to various embodiments including a Bragg waveguide and a reflector.

FIG. 5D is a block diagram illustrating details of the tunable multi-pass compressor 150 and second stage compressor 160 of FIG. 1B, according to various embodiments including a multi-pass loop 500. FIG. 5D differs from FIG. 5A in that the embodiments of loop 500 illustrated are configured to compress the pulse instead of stretch the pulse, and a second stage compressor 502 comprising a fiber Bragg grating 550' is configured for further compressing the output pulse 565. FIG. 5D further differs from FIG. 5A in that the optional amplifier 130 and the optional delay line 560 are omitted. In these embodiments, the loop 500 includes the switch 520, the circulator 540, and the fiber Bragg grating 550. The loop 500 may further include the delay line 560 when configured for compressing a pulse.

The pulse can be compressed multiple times. The same pulse can be directed around the loop 500 (i.e., from the switch 520, through the circulator 540, the fiber Bragg grating 550 and back to the switch 520) multiple times. For example, a pulse received at the switch 520 can be directed again to the circulator 540. In each pass through the elements in the loop 500, the pulse again is directed into and out of the fiber Bragg grating 550 and thus, further compressed. After one or more passes through the loop 500, the state of switch 520 may be changed such that the compressed pulse 545 is directed as an output pulse 565, rather than towards the circulator 540.

The compression of the pulse may be tunable. The amount of compressing experienced by the pulse, and thus, the pulse width, can be tuned by controlling the number of times the pulse is directed through the loop 500, using the switch 520. Thus, the output pulse width of the loop 500 may be tuned by opening or closing the switch 520 at appropriate times. For example, in some embodiments, the loop 500 may be designed to compress the pulse using from one to one hundred passes, such that the width of the output pulse 565 may be tunable to one hundred available pulse widths. The loop 500 may be configured for selection of more or fewer than one hundred passes.

In various embodiments, the loop 500 may be used to compress the pulse at least 1, 2, 10, 30, 100, or more times. In some embodiments, the pulse is attenuated, for example, two percent each pass through the loop 500. When the attenuation is two percent per pass, the pulse may be attenuated about fifty percent after thirty-four passes.

Coarse and fine adjustment may be used to control the output pulse width. The second stage compressor 502 comprises a circulator 540 and the fiber Bragg grating 550' and is disposed to compress the output pulse 565. In some embodiments, the fiber Bragg grating 550' in the second stage compressor 502 is configured to compress the pulse by a greater degree than a single pass through the fiber Bragg grating 550 in the loop 500. Thus, the loop 500 may be used for fine adjustment of the compression of the pulse, whereas the second stage compressor 502 may be used for large scale compression of the pulse. In some embodiments, a multi-pass Bragg grating (e.g., a volume Bragg grating) may be used in the second stage compressor 502 instead of the fiber Bragg Grating 550', for greater compression of the output pulse 565.

In some embodiments; a volume Bragg grating, Bragg waveguide, or other Bragg grating may be substituted for the fiber Bragg grating 550 and/or the fiber Bragg grating 550'. In various embodiments, the switch 520, the amplifier 130, the circulator 540, the fiber Bragg grating 550, the delay line 560, the pulse source 110, and/or beam steering optic components may be mounted and/or fabricated on a wafer.

Figure 6:
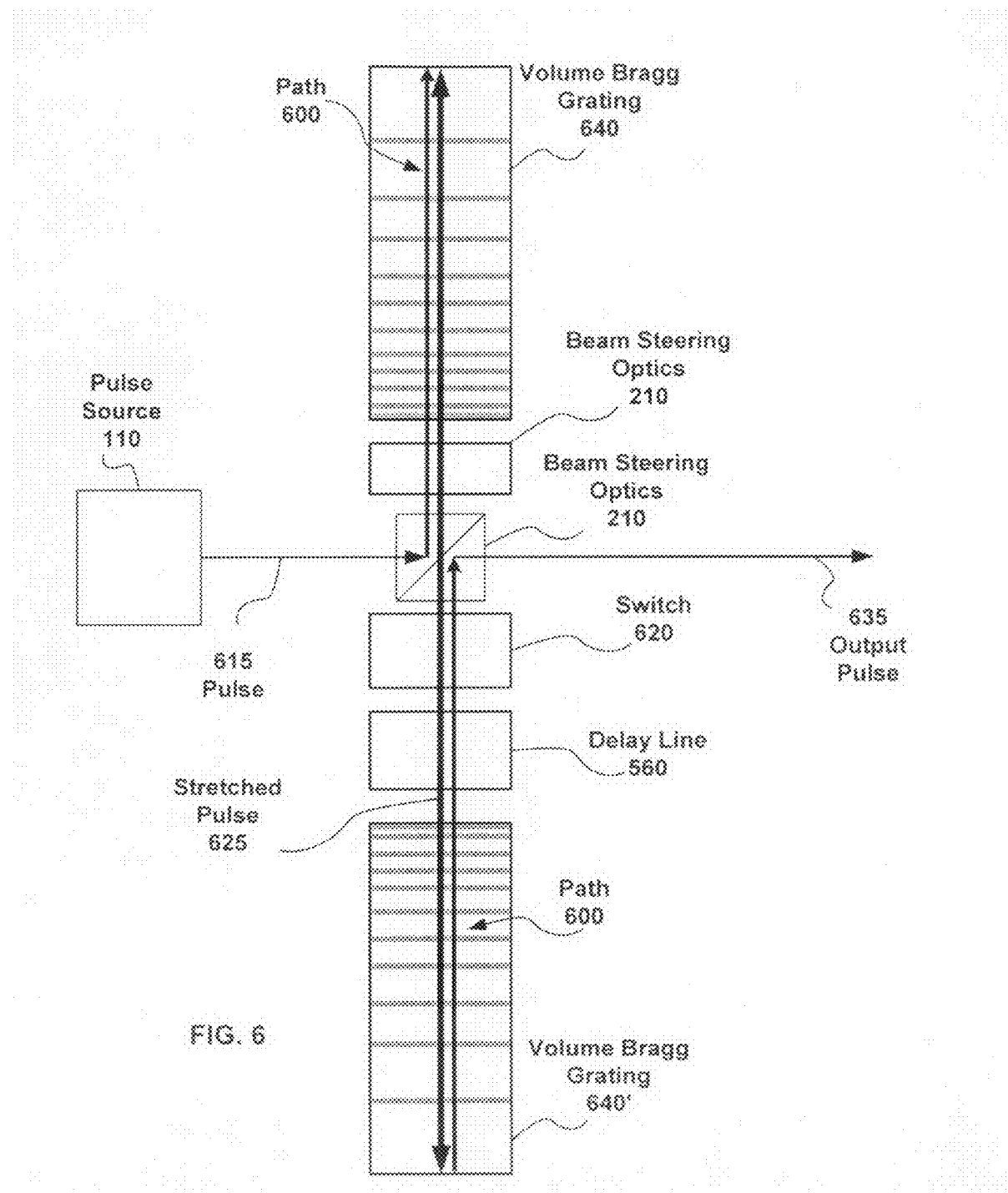
FIG. 6 is a block diagram illustrating alternative embodiments of a fiber Bragg grating used for stretching a pulse.

FIG. 6 is a block diagram illustrating details of the multi-pass stretcher 120 of FIG. 1A, including one or more multi-pass path 600, according to various embodiments. The multi-pass stretcher 120 includes one or more beam steering optics 210, a volume Bragg grating 640, a switch 650, an optional delay line 560, and an optional volume Bragg grating 640', which may be disposed to form the path 600 for a pulse 615. In some embodiments, the volume Bragg grating 640 and/or 640' may be replaced by a fiber Bragg grating or any other Bragg waveguide. The beam steering optic 210 is configured to receive the pulse 615 from the pulse source 110 and direct the pulse 615 to the volume Bragg grating 640. The volume Bragg grating 640 may be configured to stretch the pulse 615 and return a stretched pulse 625, via the beam steering optics 210, the switch 650, and the delay line 560, to the volume Bragg grating 640'. The volume Bragg grating 640' may further stretch the stretched pulse 625 and return the stretched pulse 625 to the switch 650 via the delay line 560. In some embodiments, the volume Bragg grating 640 is replaced by a reflecting element. In these embodiments, volume Bragg grating 640 may be used alone to stretch the pulse 615.

The stretched pulse 625 may be directed through the path 600 multiple times in a first state of the switch 650, thus, producing a multiply-stretched pulse. For example, the switch 650 may direct the stretched pulse 625 through the path 600 to the volume Bragg grating 640 again. In a second state of the switch 650, the stretched pulse 625 is directed out of the path 600 as an output pulse 635. In some embodiments, the switch 650 is configured to adjust the polarization of the pulse in order to control whether it is again directed into the volume Bragg grating 640 or directed as output. In each pass through the path 600, the stretched pulse 625 is again directed in and out of the volume Bragg grating 640 and 640' and thus, further stretched. The delay line 560 may be used to control distortion as the length of the stretched pulse 625 increases. In some embodiments, the embodiments of the multi-pass stretcher 120 illustrated in FIG. 6 can include an embodiment of Amplifier 130 configured to amplify the stretched pulse 625 between passes though the volume Bragg grating 640 and/or volume Bragg grating 640'.

The width of the output pulse 635 may be tunable. For example, the amount of further stretching applied to the stretched pulse 625, and thus, the width of the output pulse 635, can be tuned by controlling the number of times the stretched pulse 625 is directed through the elements in the path 600. Thus, the output pulse width of the path 600 may be tuned by changing the states of the switch 650 at appropriate times. For example, the path 600 may be configured to stretch the pulse 615 using from one to one hundred passes such that the width of the output pulse 635 may be tunable to select one of one hundred available pulse widths. The switch may be configured for selection from more or fewer than one hundred passes.

In various embodiments, the stretched pulse 625 may be directed between the switch 650, the volume Bragg grating 640 and 640', and/or the delay line 560 using beam steering optics 210 described elsewhere herein. In some embodiments, an optic fiber, for example, a tapered fiber bundle, may be used to direct a pulse between any elements of the path 600 (e.g., the switch 650, the volume Bragg grating 640 and 640', the delay line 560 and/or other beam steering optics 210).

In FIG. 6, the volume Bragg grating 640 and/or 640' are illustrated as configured to stretch the pulse 615. However, a practitioner with ordinary skill in the art will recognize that the volume Bragg grating 640 and/or 640' may be configured to compress the pulse 615 in the path 600 instead of stretch the pulse 615. Moreover, such a path 600 configured to compress a pulse may be coupled to a second stage compressor, such as that illustrated in FIG. 5D.

In some embodiments, a volume Bragg grating or Bragg waveguide plus a reflector may be substituted for the volume Bragg grating 640 and/or 640'. In various embodiments, the volume Bragg grating 640 and/or 640', the switch 650, the delay line 560, the beam steering optics 210 and/or the pulse source 110 may be mounted and/or fabricated on a wafer.

Various embodiments include methods for stretching or compressing a pulse including directing the pulse through a Bragg grating multiple times. The multiple passes through the Bragg grating result in further stretching or compression of the pulse to create multiply-stretched or multiply-compressed pulses.

Figure 7:
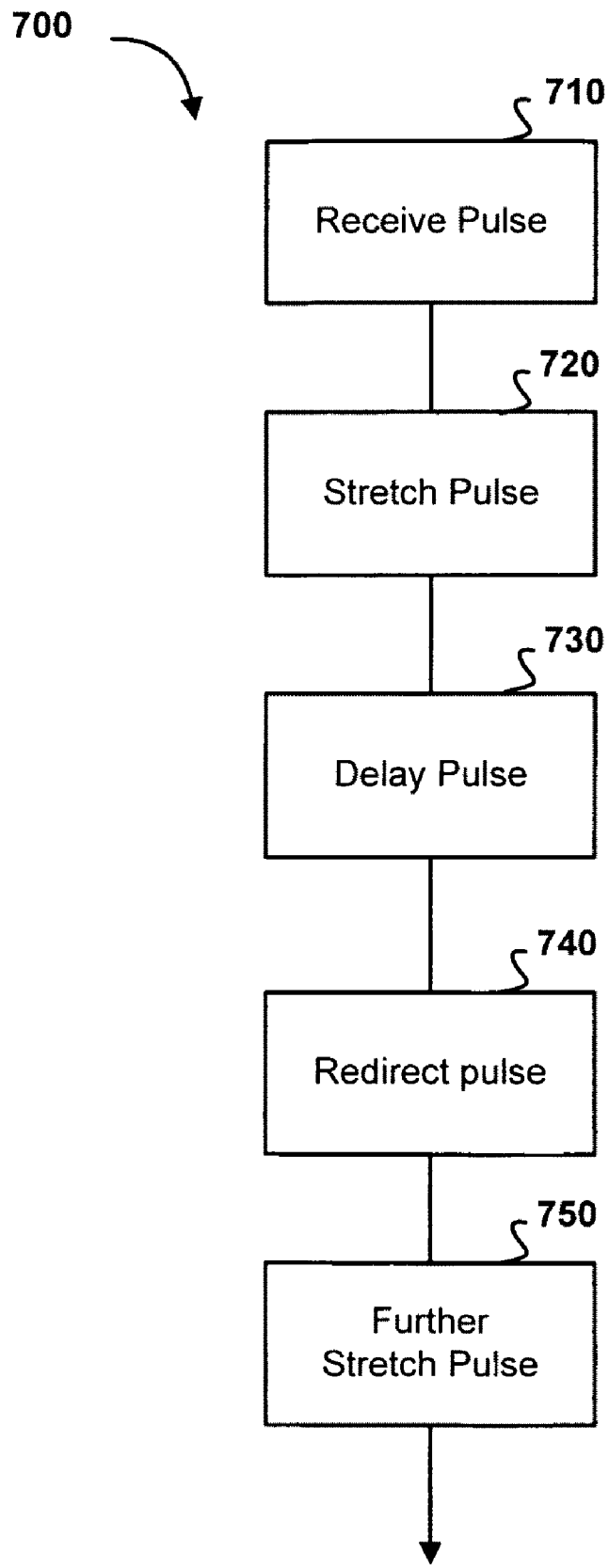
FIG. 7 is a flow diagram illustrating methods for stretching a pulse, according to various embodiments.

FIG. 7 is a block diagram illustrating a method 700 for stretching a pulse, according to various embodiments. In step 710, a pulse is received by a Bragg grating (e.g., the fiber Bragg grating 550, the volume Bragg grating 320, Bragg waveguide 570; and/or the like) from a pulse source. Beam steering optics (e.g., the beam steering optics 210) may be used to direct the pulse to the Bragg grating. In some embodiments, the beam steering optics include a lens configured to produce a converging or diverging pulse. In various embodiments, the beam steering optics are configured to rotate the pulse, split the pulse, amplify the pulse, delay the pulse, switch the pulse, reflect the pulse, modify polarization of the pulse, and/or the like.

In step 720, a pulse (e.g., pulse 205) is stretched by a Bragg grating (e.g., Bragg grating 220) to produce a stretched pulse 215. Optionally, the path that the pulse follows (e.g., the stretching path 212 or the compression path 242) into and out of the Bragg grating 220 determines whether the pulse is stretched or compressed. The beam steering optics (e.g., beam steering optics 210) are configured to direct the pulse into the stretching path 212 through the Bragg grating 220 to stretch the pulse 205.

In some embodiments, the length of the stretched pulse 215 may approach the length of the stretching path 212 into and out of the Bragg grating 220 as the stretched pulse 215 is stretched. In optional step 730, the stretched pulse 215 is delayed to avoid distortion, truncation, and/or the like. In some embodiments, the step 730 further includes amplifying the stretched pulse 215. In some embodiments, the amount of stretching possible is limited by a length of a delay line, such as delay line 560. Alternatively, the stretched pulse 215 is amplified instead of delayed in step 730.

In step 740, the stretched pulse 215 is redirected to the Bragg grating 220 using beam steering optics 210. The stretched pulse 215 is redirected to the stretching path 212 through the Bragg grating 220 configured to stretch the stretched pulse 215 again.

In step 750, the stretched pulse 215 is stretched further using the Bragg grating 220, to produce a multiply-stretched pulse. In some embodiments, the method 700 includes further stretching the stretched pulse 215 in the same Bragg grating 220. For example, in a volume Bragg grating 220 multiple paths of the stretched pulse 215 through the Bragg grating 220 can be separated spatially. The beam steering optics 210 may be used to provide the spatial separation of the paths. In another embodiment, the multiple paths of the stretched pulse 215 through a fiber Bragg grating 220 may be separated in the time domain, using beam steering optics 210, including a switch (e.g., the switch 520 illustrated in FIG. 5A). In some embodiments, the method 700 includes directing the stretched pulse 215 into separate Bragg gratings 220.

Although the method 700 for stretching a pulse is described as being comprised of various steps (e.g., receiving a pulse 710, stretching the pulse 720, delaying the pulse 730, redirecting the pulse 740, and further stretching the pulse 750), fewer or more steps may comprise the method 700 and still fall within the scope of various embodiments. For example, steps 730-750 may be repeated multiple times.

Figure 8:
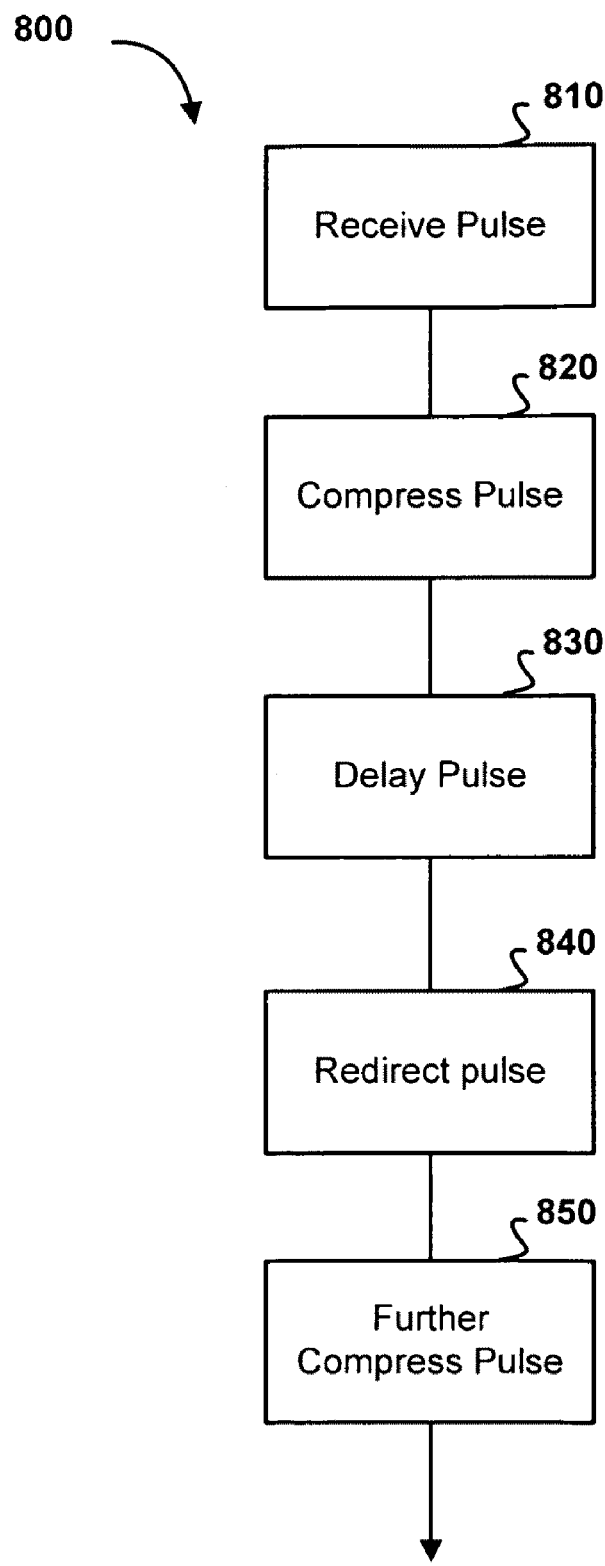
FIG. 8 is a flow diagram illustrating methods for compressing a pulse, according to various embodiments.

FIG. 8 is a block diagram illustrating a method 800 for compressing a pulse through spatially separated multiple paths, according to one embodiment. The steps 810-850 are similar to the steps 710-750, respectively, except that the pulse is compressed instead of stretched.

In step 810, a pulse (e.g., the pulse 235) is received by the Bragg grating 220. In step 820, the pulse 235 is compressed by the Bragg grating 220. The beam steering optics 210 are configured to direct the pulse 235 through the compression path 242 in the Bragg grating 220.

In optional step 830, a compressed pulse (e.g., the compressed pulse 245) is delayed. In step 840, the compressed pulse 245 is redirected, using the beam steering optics 210, to the compression path 242 through the Bragg grating 220 for further compression. In step 850, the compressed pulse 245 is further compressed using the Bragg grating 220 to generate a multiply-compressed pulse. In some embodiments, the pulse 235 can be compressed by the same Bragg grating 220 used for stretching an input pulse 205, using the beam steering optics 210 to select the stretching path 212 or the compression path 242, as described elsewhere herein. In another embodiment, multiple paths of the compressed pulse 245 through a Bragg grating 220 may be separated in the time domain, using the beam steering optics 210. In some embodiments, the amount of compression that is possible is limited by the length of a delay line, such as delay line 560.

Although the method 800 for compressing a pulse is described as being comprised of various steps (e.g., receiving a pulse in step 810, compressing the pulse in step 820, delaying the pulse in step 830, redirecting the pulse in step 840, and further compressing the pulse in step 850), fewer or more steps may comprise the method 800 and still fall within the scope of various embodiments. For example, the steps 840 and 850 may be repeated multiple times.

Figure 9:
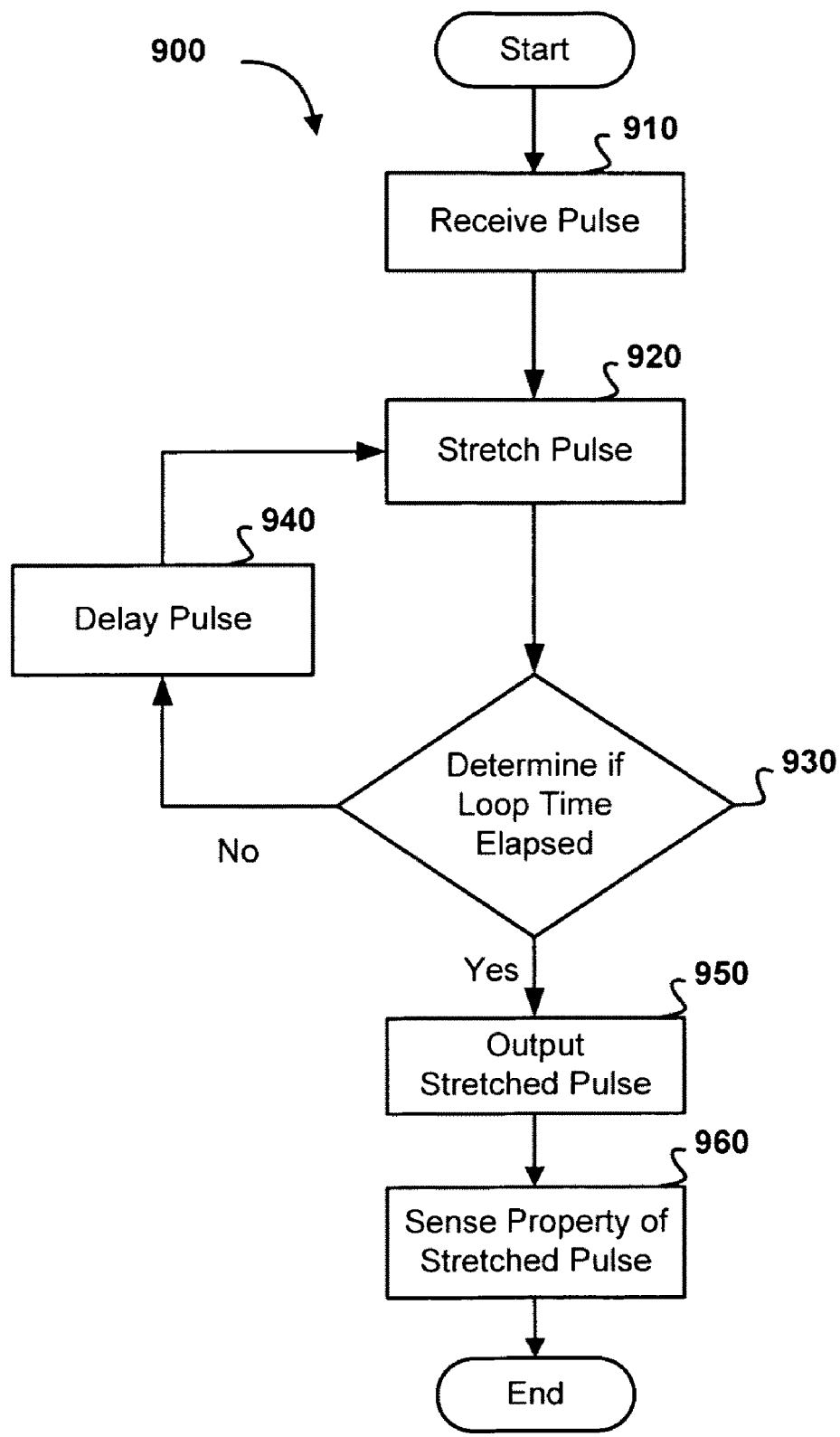
FIG. 9 is a block diagram of a method of tuning the stretching of a pulse, according to various embodiments.
Figure 10:
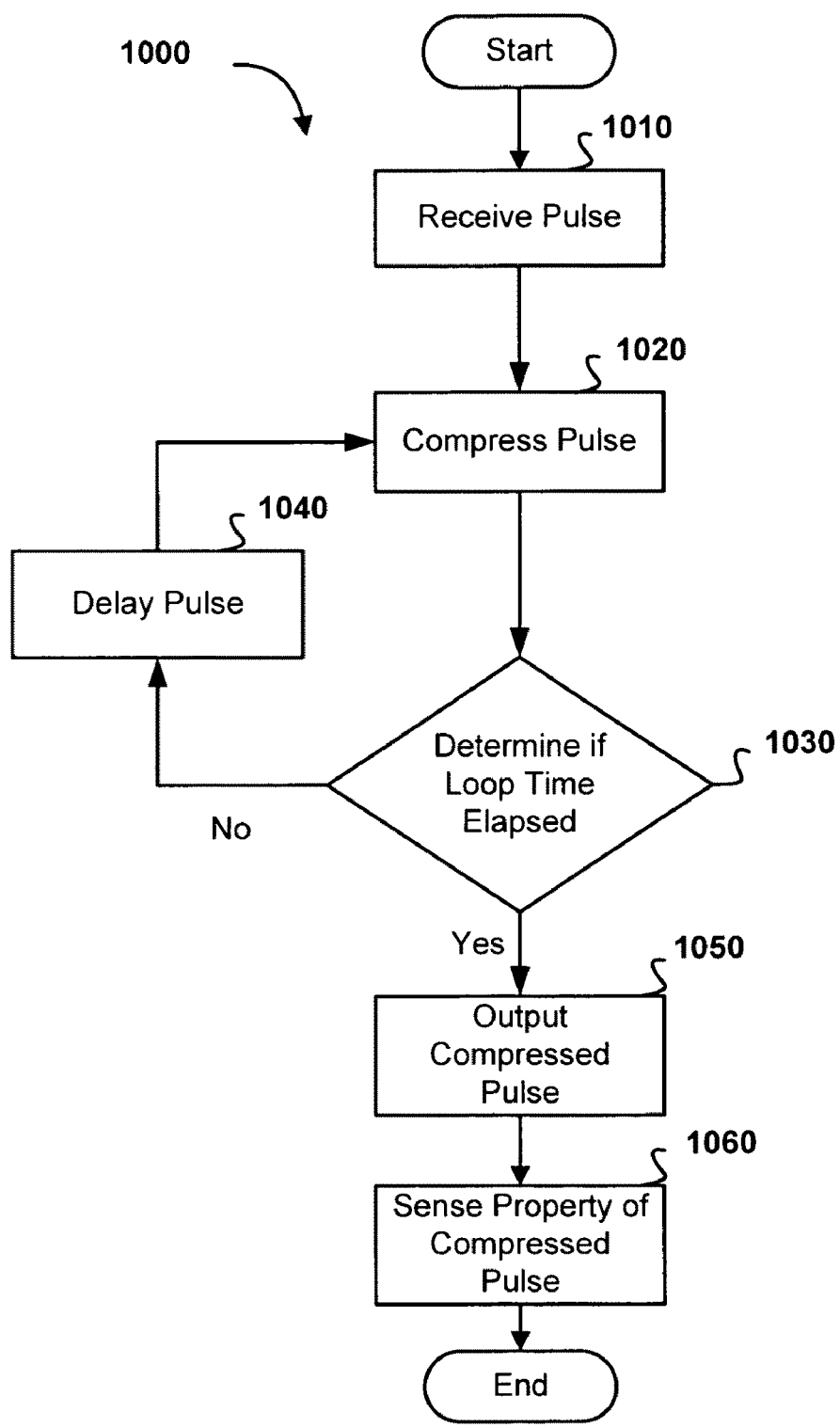
FIG. 10 is a block diagram of a method of tuning the compression of a pulse, according to various embodiments.

In FIGS. 9 and 10, the width of a stretched or compressed pulse may be tuned by turning a switch on or off at appropriate times. For example, the number of passes through a grating for stretching or compressing the pulse may be controlled using the switch to direct the pulse into the grating multiple times or away from the grating. Thus, the switch can be used to control the width of the stretched or the compressed pulse.

FIG. 9 is a block diagram of a method 900 of tuning the stretching of a pulse, according to various embodiments. In a step 910, a pulse (e.g., the pulse 515) is received by a fiber Bragg grating (e.g., the fiber Bragg grating 550). The pulse 515 may be directed to the fiber Bragg grating using beam steering optics 210. In a step 920, the pulse 515 is stretched using the fiber Bragg grating 550.

A step 930 includes determining if a loop time has elapsed. The loop time is a time a pulse has been in a loop, such as loop 500. The longer the loop time, more times a pulse will have passed through a Bragg grating configured to stretch the pulse. Thus, the longer the loop time, the greater the stretching that will occur. For example, a timer may be coupled to the switch 520 and set to change the state of the switch 520 after a predetermined loop time has elapsed. If the loop time has not elapsed, the stretched pulse 545 is directed (e.g., using the switch 520) to be stretched again.

In the optional step 940, the stretched pulse 545 is delayed. As the length of the stretched pulse increases, as a result of multiple stretching steps, the delay may be useful in accommodating longer stretched pulses 545 from the fiber Bragg grating 550 and/or associated beam steering optics 210 to prevent truncation of the stretched pulse 545 when the switch 520 is changed to direct the stretched pulse 545 as output. In some embodiments, the step 940 further includes amplifying the stretched pulse 545. Alternatively, the stretched pulse 545 is amplified instead of delayed in step 940.

After the delay and/or amplification at step 940, the stretched pulse 545 may be stretched again in step 920, to generate a multiply-stretched pulse. Optionally, step 940 is omitted and the stretched pulse 545 is stretched again at step 920, directly after step 930. The stretched pulse 545 may be stretched multiple times in a loop comprising the steps 920, 930, and 940.

If the loop time has elapsed at step 930, the switch 520 may change state and the stretched pulse 545 is output at step 950. In an optional step 960, a sensor determines a property of the output pulse. In various embodiments, the property determined by the sensor in step 960 includes the length of the stretched pulse 545, the intensity of the stretched pulse 545, the power of the stretched pulse 545, a wavelength of the stretched pulse 545, and/or the like. Optionally, the loop time is changed based on the property determined in step 960.

Although the method 900 for stretching a pulse is described as being comprised of various steps (e.g., receiving a pulse in step 910, stretching the pulse in step 920, determining if the loop time has elapsed in step 930, delaying the pulse in step 940, outputting the pulse in step 950, and sensing a property of the stretched pulse in step 960), fewer or more steps may comprise the method 900 and still fall within the scope of various embodiments.

FIG. 10 is a block diagram illustrating a method 1000 of tuning the compression of a pulse, according to various embodiments. The steps 1010-1060 are similar to the steps 910-960, respectively, except where the method 1000 of FIG. 10 differs from the method of FIG. 9 in that the pulse is compressed instead of stretched, using multiple passes through a Bragg-grating.

Although the method 1000 for compressing a pulse is described as being comprised of various steps (e.g., receiving a pulse 1010, compressing the pulse 1020, determining if the pulse length is correct 1030, delaying the pulse 1040, and outputting the pulse 1050), fewer or more steps may comprise the method 1000 and still fall within the scope of various embodiments. For example, steps 1020-1050 may be used for fine compression adjustment and a second stage compressor may follow step 1050 for coarse compression.

The discussion will now turn to embodiments of the invention that can provide pulse compression to a time shorter than a few picoseconds by means of a nonlinear Bragg grating formed in a polarization-maintaining ("PM") fiber such as the PM fiber 552 shown in FIG. 5A. Compact grating compressors have presented issues of high third-order dispersion. Such high order dispersion is mismatched to the dispersion parameters of standard fiber stretchers and has prevented compression of a pulse below a few picoseconds. In addition, non-PM fibers can create a change of polarization state of a signal and produce polarization-hole burning in polarization maintaining erbium-doped fiber amplifiers (PM-EDFAs) as well as a drop in efficiency during compression.

Moreover, nonlinearities such as self-phase modulation ("SPM") can occur because the nonlinear phase created by SPM is proportional to the intensity of the pulse, and the chirp created by the nonlinear phase is proportional to the derivative of the phase. Consequently, the chirp of the signal may become increasingly nonlinear as the intensity of the signal departs from an ideal parabolic shape and becomes rectangular due to the sharp cut-offs of the devices used. Controlling the dispersion in a bulk compressor can require moving parts, an undesirable complication.

Figure 11:
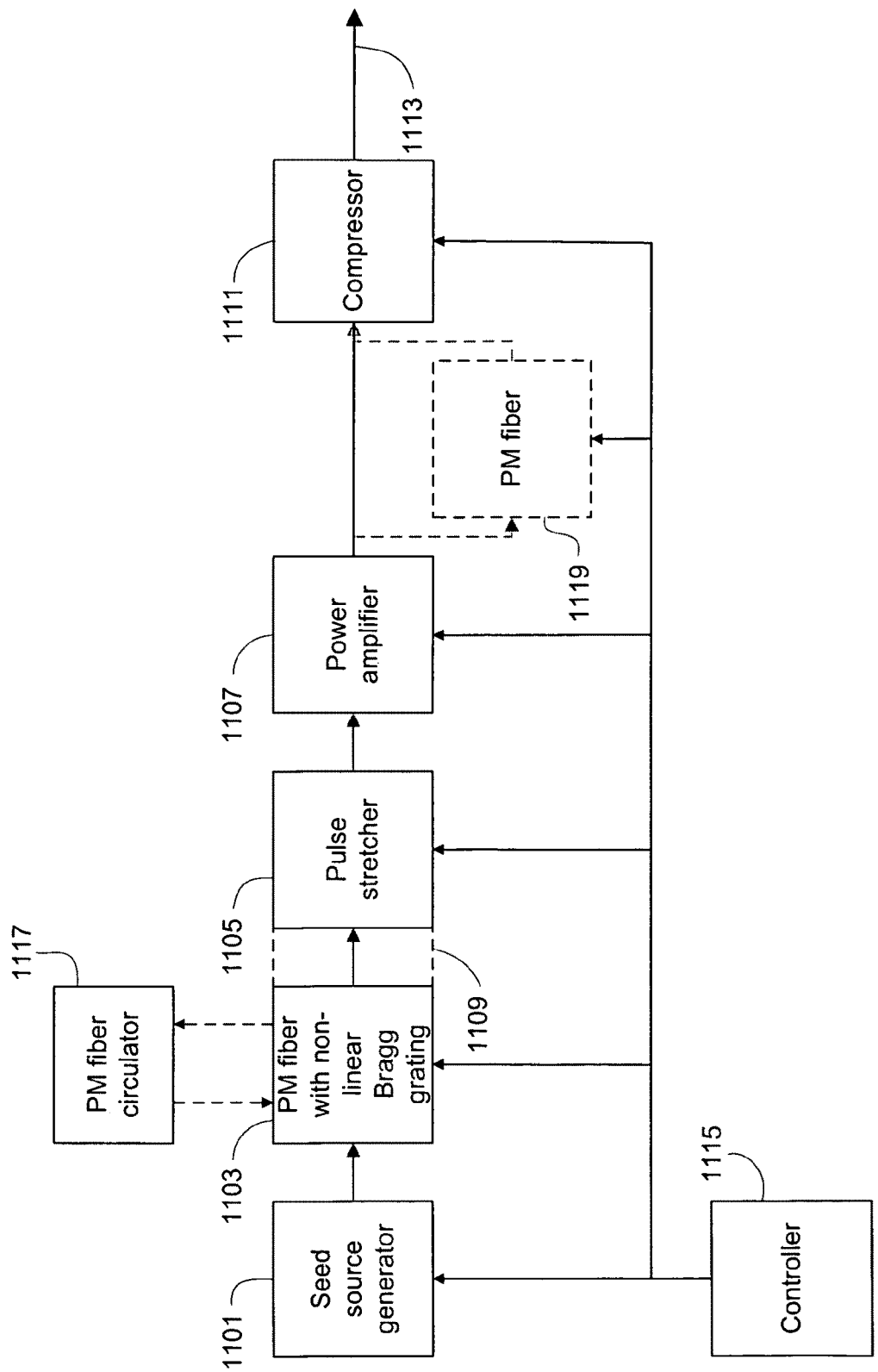
FIG. 11 is a block diagram of an ablation apparatus according to various embodiments.

Pulses shorter than a few picoseconds in duration may be generated in a system such as that shown in FIG. 11. This system includes a seed source generator 1101 that provides optical pulses to a nonlinear Bragg grating formed in a polarization-maintaining ("PM") fiber 1103. From the PM fiber 1103, the pulses propagate through a pulse stretcher 1105 to a power amplifier 1107. In the illustrated embodiment, the PM fiber 1103 precedes the pulse stretcher 1105, but in other embodiments, the PM fiber 1103 follows the pulse stretcher 1105. In still other embodiments, the PM fiber 1103, itself, serves as the pulse stretcher as indicated in the drawing by dotted lines 1109 connecting the PM fiber 1103 with the pulse stretcher 1105 to form a single element. After amplification in the power amplifier 1107, the stretched pulses are compressed in a compressor 1111 to provide output pulses at output point 1113. A controller 1115 controls system operation. In some embodiments, a PM fiber circulator 1117 may be provided to route pulses in and out of the PM fiber 1103.

The nonlinear Bragg grating in the PM fiber 1103 may have sloped bandwidth edges to avoid a sharp cut-off. The PM fiber 1103 may provide third-order compensation but, essentially, no fourth-order compensation. The PM fiber 1103 may have an approximately-parabolic reflectivity profile, and this approximately-parabolic portion of the reflectivity profile may surround a substantially-flat center portion. Furthermore, the PM fiber 1103 may have edges that are apodized to create a super-Gaussian reflectivity profile to reduce nonlinearities. In some embodiments, the PM fiber 1103 is specially designed to eliminate cladding modes.

The compressor 1111 may be a grating-pair compressor, a fiber compressor, a volume Bragg hologram compressor, or the like. The compressor 1111 may have a dispersion that is positive but lower than the dispersion of the PM fiber 1103. In some embodiments, the amplified pulses from the amplifier 1107 pass through a length of PM fiber 1119 en route to the compressor 1111.

Figure 12:
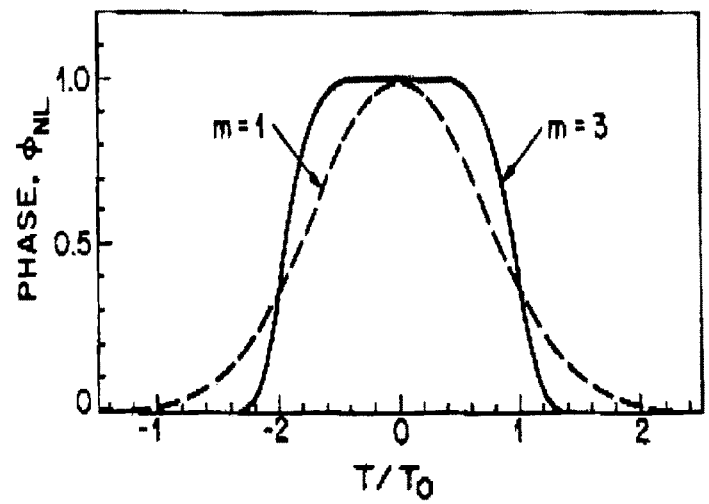
FIG. 12 is a graph of temporal variation of SPM-induced phase shift for Gaussian (dashed curve) and super-Gaussian (solid curve) pulses.
Figure 13:
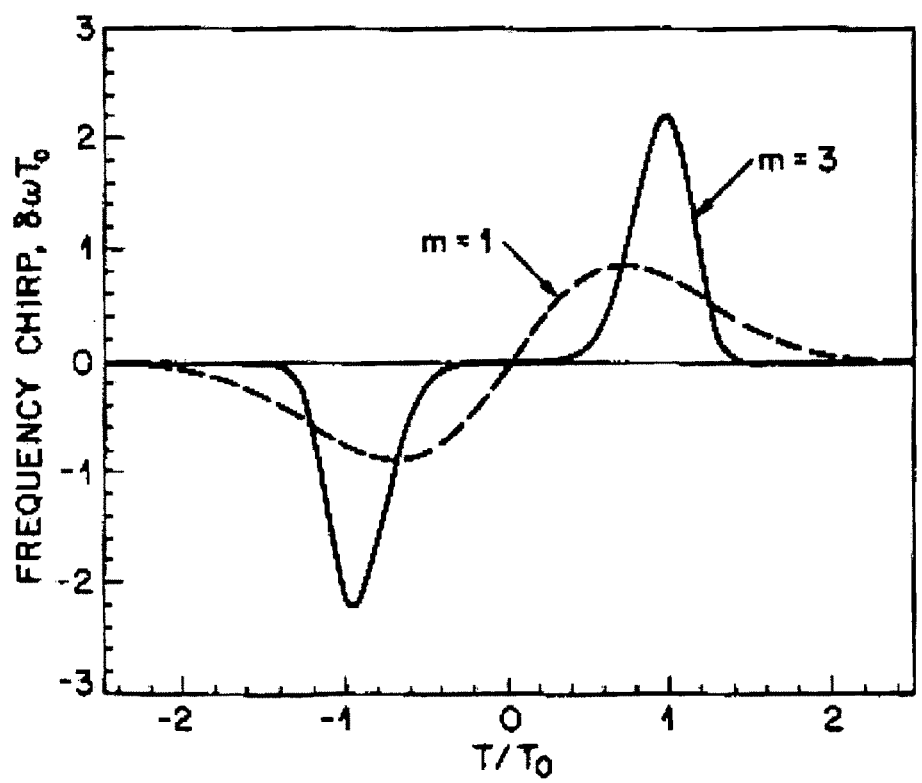
FIG. 13 is a graph of frequency chirp for Gaussian (dashed curve) and super-Gaussian (solid curve) pulses.

The length of the PM fiber 1119 may be adjusted to provide quadratic dispersion less than 5% of the quadratic dispersion of the compressor 1111. This may fine-tune the entire system for optimal pulse compression, as shown graphically in FIGS. 12 and 13. FIG. 12 shows the temporal variation of SPM-induced phase shift for Gaussian pulses (dashed curve) and super-Gaussian pulses (solid line curve). FIG. 13 shows the frequency chirp δω for Gaussian (dashed curve) and super-Gaussian (solid line curve) pulses.

Figure 14:
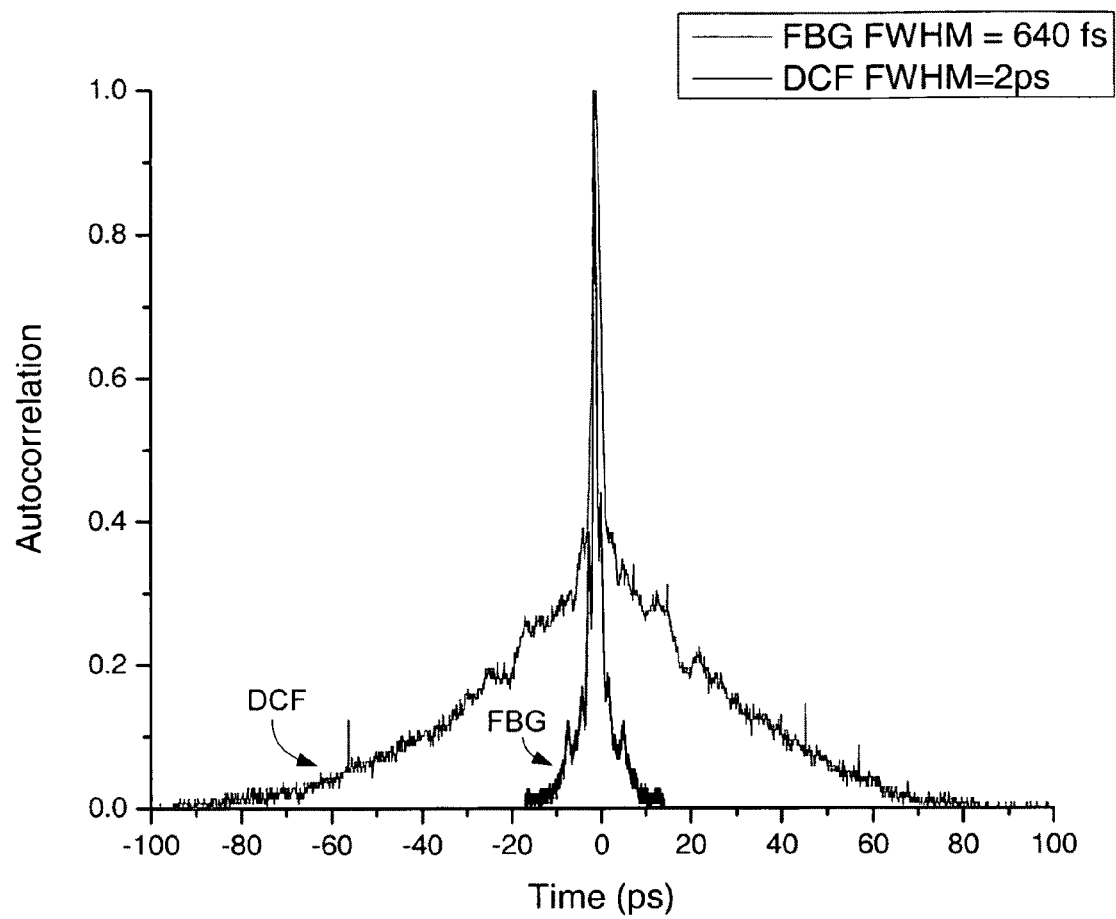
FIG. 14 is a graph showing a comparison of autocorrelations of pulses stretched with a dispersion-compensating fiber and a polarization-maintaining nonlinear fiber Bragg grating.

FIG. 14 depicts a comparison of autocorrelations of pulses stretched with a dispersion-compensating fiber ("DCF") in the upper curve, and with a polarization-maintaining nonlinear fiber Bragg grating ("FBG") in the lower curve. A non-sharp cut-off at the edges of the FBG bandwidth may have a lower phase derivative than a sharp cut-off would, and therefore may prevent high nonlinearities such as SPM. As previously discussed, the nonlinear phase created by SPM is proportional to the intensity of the pulse, and the chirp created by the nonlinear phase is proportional to the derivative of the phase. Consequently, the chirp of a signal may not become increasingly nonlinear as the intensity of the signal departs from an ideal parabolic shape and becomes rectangular due to the sharpness of the cut-offs of the FBG bandwidth. Dispersion of the FBG can be controlled without requiring moving parts as in a bulk compressor in order to perform sufficiently accurate dispersion compensation.

Figure 15:
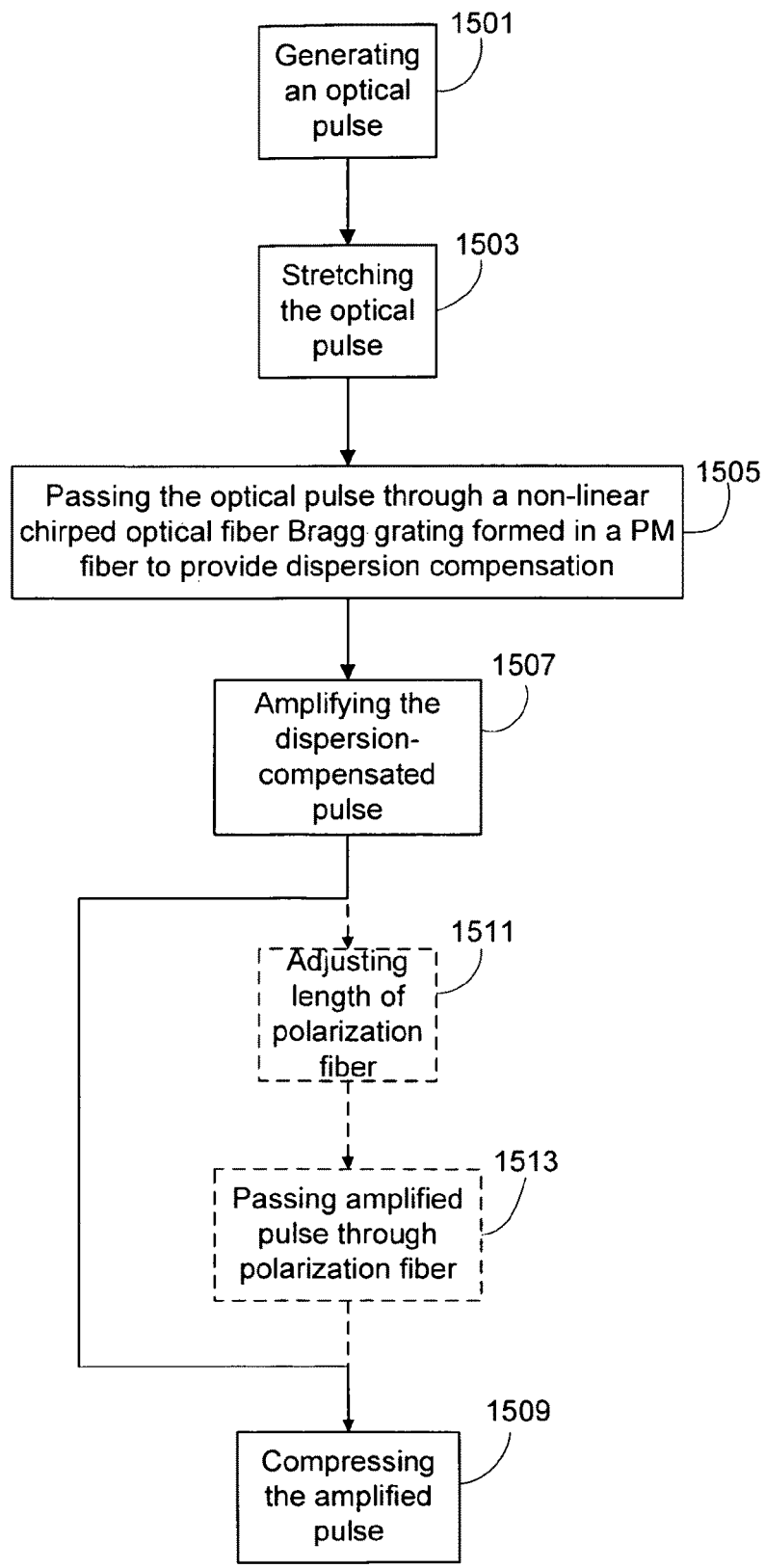
FIG. 15 is a flow chart of a method of generating ultra-short pulses according to various embodiments.

As shown in FIG. 15, a method of generating ultra-short pulses, according to an embodiment of the invention, includes generating an optical pulse 1501, stretching the pulse 1503, passing the pulse through a nonlinear Bragg grating formed in a PM fiber to provide dispersion compensation 1505, amplifying the dispersion-compensated pulse 1507, and compressing the amplified pulse 1509. The pulse may be stretched 1503 before or after passing through the grating 1505, and the stretching 1503 may be accomplished in the grating along with the dispersion compensation 1505. Some embodiments include adjusting the length of a polarization fiber 1511 to fine-tune system dispersion and passing the amplified pulse through the polarization fiber 1513.

A complete system embodying the invention may comprise an ultra-short-pulse ablating system that can ablate almost any material with ultra-short, high-intensity pulses generated as described above. In some embodiments, the overall system may be divided into subsystems. For example, a seed subsystem may include a seed generator, which may be a mode-locked laser, and also include a Bragg grating, a booster amplifier, a pulse picker, and a dispersion-tuning loop. A fiber amplifier system may include a preamplifier, an Er/Yb booster amplifier, and a Treacy compressor.

Figure 16:
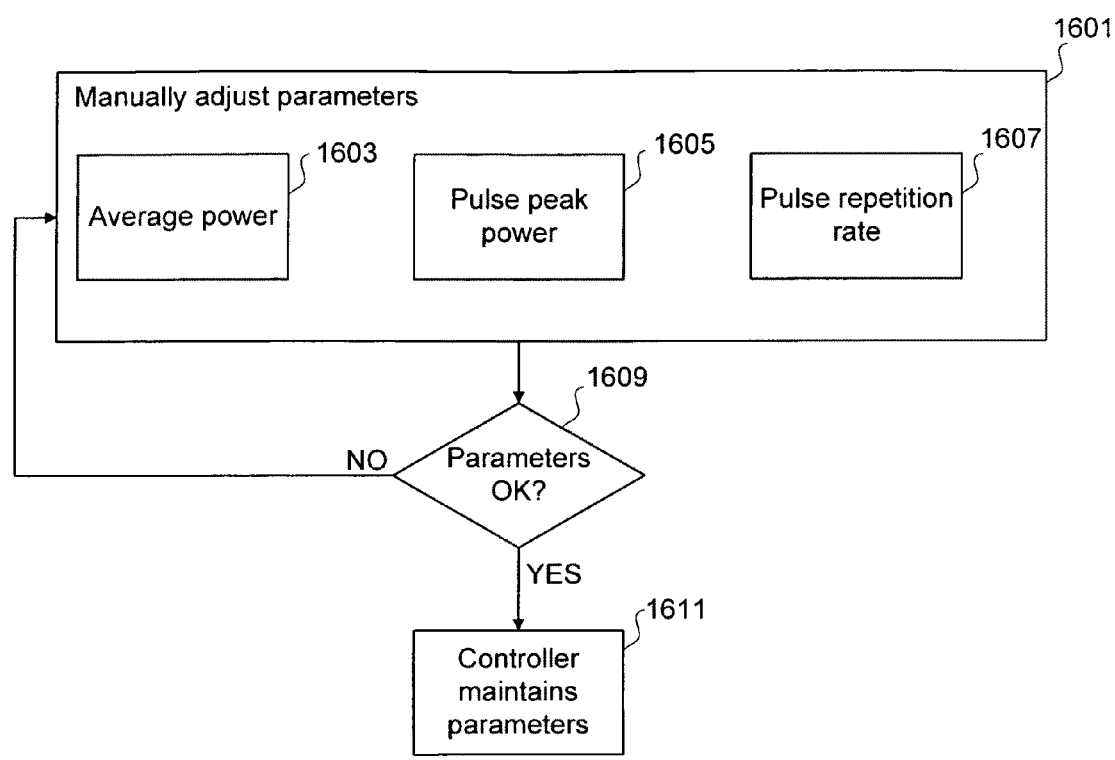
FIG. 16 is a flowchart of a method of adjusting parameters of an ablation apparatus according to various embodiments.

FIG. 16 shows an exemplary method of the invention for controlling a system, such as described above. The exemplary method includes manually adjusting 1601 one or more system parameters. These parameters may include average power 1603; pulse peak power 1605, and pulse repetition rate 1607, for example. Once a determination has been made that these parameters are set appropriately 1609, the controller maintains the parameters 1611 during changing environmental conditions while avoiding overheating or other potentially damaging conditions. Other examples of parameters that may be adjusted, either manually or by the controller, include input optical signal power, optical pumping power of fiber amplifiers, timing of input pulses, length of input pulses, timing between start of optical pumping and start of optical signals, and average degree of energy storage in fiber. Generally, the pulse generator determines the input repetition rate of the amplifier. Energy per pulse may be tuned to about three times threshold per pulse; this may be derived within the pulse generator from a higher repetition rate oscillator.

The invention may be embodied in a development kit that enables a user to develop specifications for a desired application. Such a kit may include one or more feedback loops to control system variables such as pulse energy, pulse duration, and repetition rate.

Figure 17:
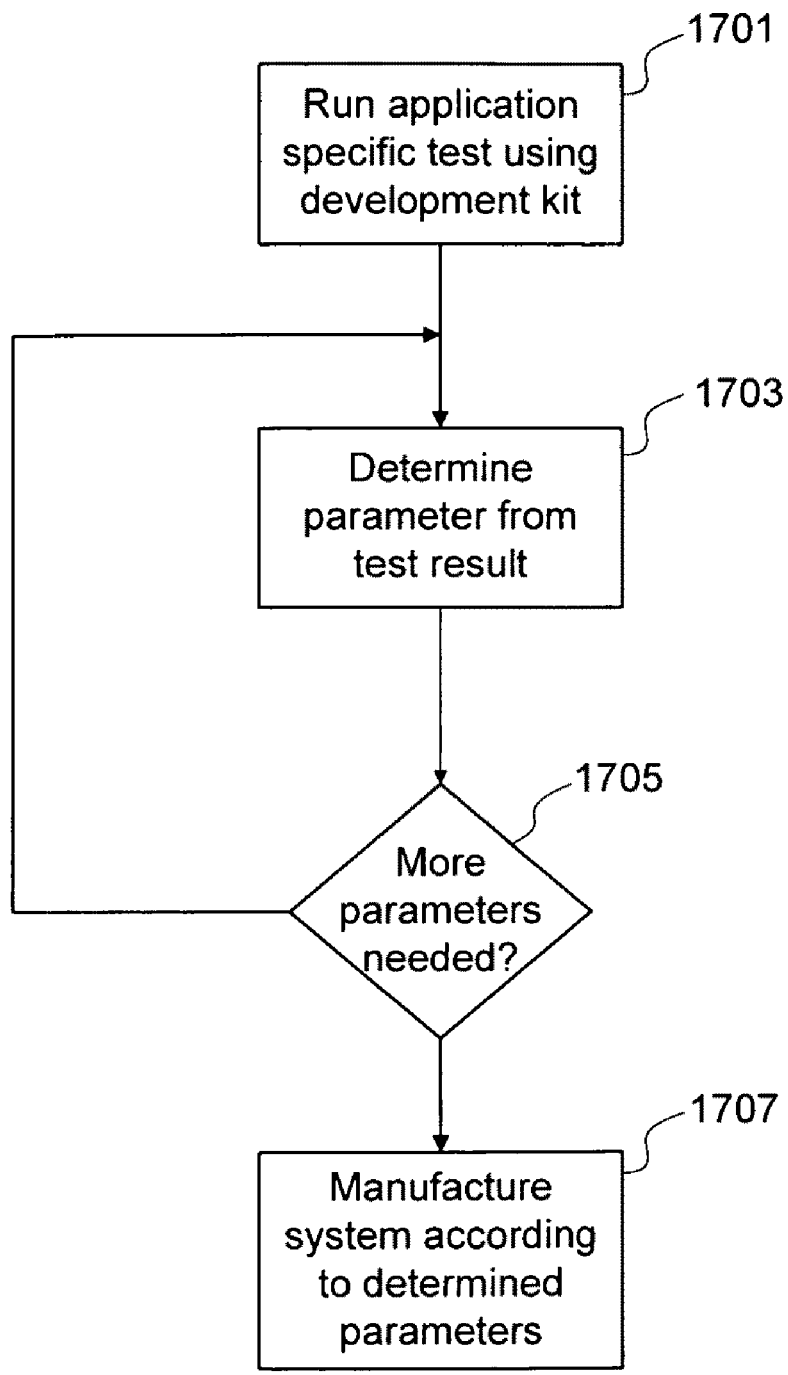
FIG. 17 is a flow chart of a method of developing an ablation apparatus according to various embodiments.

As shown in FIG. 17, an exemplary method of developing an ablation system comprises using a development kit to run application-specific tests 1701, analyzing the results of those tests to determine design parameters 1703, and when all parameters have been determined 1705 manufacturing a complete system according to those design parameters 1707.

Figure 18:
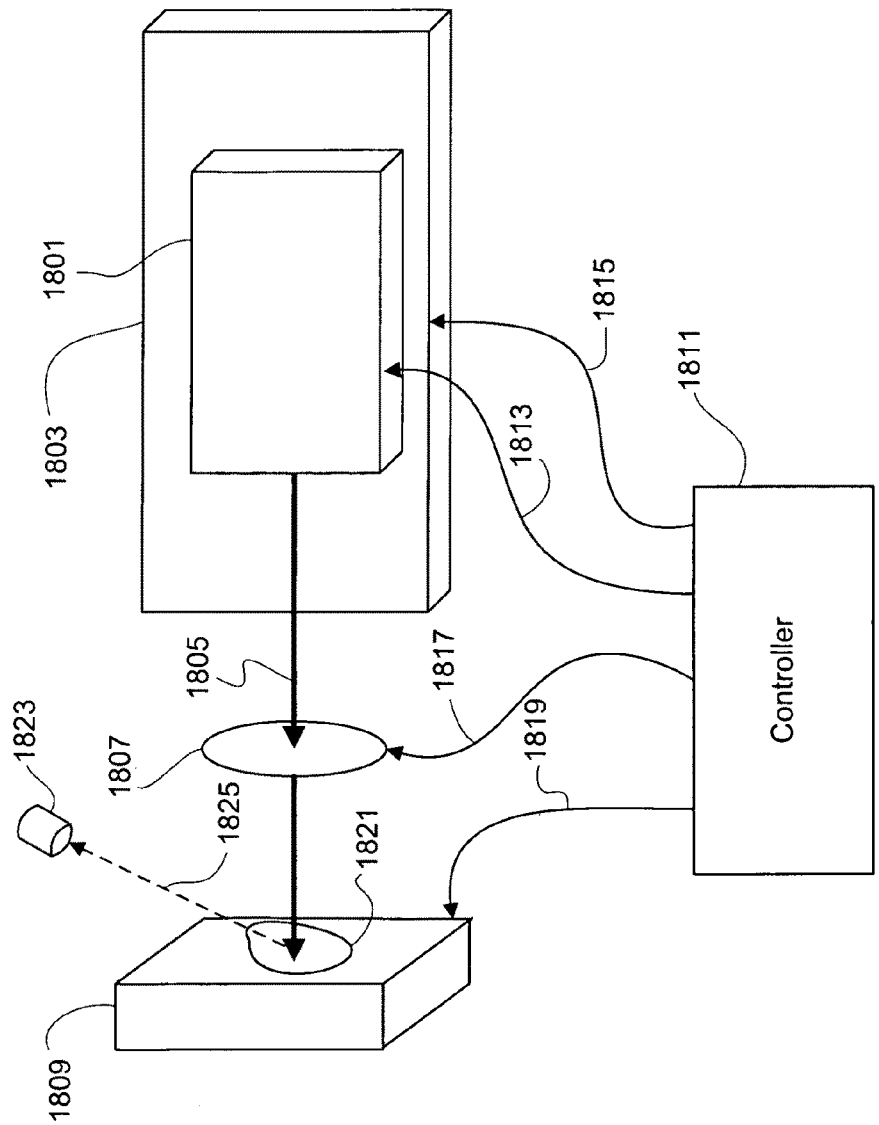
FIG. 18 is a partial block diagram of an ablation system according to various embodiments.

In some embodiments that may be particularly suitable for non-technical people in developing or using an ablation system, motion of an ablating beam relative to a target is controlled by a suitable mechanical or optical device. Either the beam or the target may be moved. For some types of targets having the target fixed in position and moving the beam relative to the target, as in the embodiment shown in FIG. 18, may be more convenient. In this embodiment art ablation apparatus 1801 is carried by a supporting surface 1803. An ablation beam 1805 passes through a lens 1807 such as a variable-focus lens to a target 1809.

A controller 1811 communicates with the ablation apparatus 1801 through a control line 1813, with the supporting surface 1803 through a control line 1815, with the lens 1807 through a control line 1817, and with the target 1809 through a control line 1819. The communication may be electrical, optical, mechanical, or the like. Not all communication lines may be present in any given embodiment; for example, if the target 1809 is fixed in position there may be no need for the controller 1811 to communicate with the target 1809 via the control line 1819.

The surface 1803 on which the ablation apparatus 1801 is mounted may be translated by a mechanism such as a servo motor, a hydraulic actuator, a linear motor, or the like (not shown). Alternatively, the ablation apparatus 1801 may be movable on the surface 1803 by a suitable mechanism. In other embodiments, the ablation apparatus 1801 may be carried by a robotic arm (not shown) rather than the surface 1803. The lens 1807 may be a variable lens that scans the beam 1805 across the target 1809, especially if only a limited area of the target 1809, such as the area 1821, is to be scanned. In some embodiments, the target 1809 is moved and the ablation apparatus 1801 is fixed in position. The lens 1807 may be omitted if not needed to focus or to scan the ablation beam 1805.

A sensor 1823, such as a photocell/may receive a reflection 1825 from the target 1809. The reflection may be of the ablation beam 1805 or of an auxiliary beam of the same or a different wavelength. The sensor 1823 may communicate with the controller 1811 or may provide a signal directly to an operator. In other instances, the operator may see the reflection without using the sensor 1823. The controller 1811 may enable or block emission of the ablation beam 1805 based on colors of the target area or based on one or more preset emission specifications.

In some embodiments, the beam 1805 is amplified in an optically-pumped amplifier (not shown) that may be a part of the ablation apparatus 1801. The controller 1811 may block emission by shutting off current to a pump diode of the amplifier. In other embodiments, the beam 1805 is amplified in a semiconductor optical amplifier, in which case blocking is accomplished by shutting off current to the semiconductor optical amplifier. In either case, there may be a manual override switch (not shown) to allow ablation regardless of any blocking.

In some embodiments, the controller 1811 may allow or block emission of the ablation beam 1805 based on distance of the ablation apparatus 1801 from the target 1809 or other preset emission specifications.

The entire ablation apparatus 1801 may be remotely located from the operator and operated by remote control. A video camera (not shown) may assist in such control. This configuration may be particularly useful if isolation (e.g., from a contagious disease) is needed or if an environment in which the ablation apparatus 1801 is to be used is hostile or dangerous.

Further details of ablation systems embodying the principles of exemplary embodiments of the invention will now be discussed. The control system may be used to vary pump diode current to regulate the temperature of the amplifier. The control system may also adjust the repetition rate of the pulse generator to control the pulse energy for efficient material removal. Further details may be found in PCT Patent Application Serial No. PCT/US2004/015835 entitled "Controlling Pulse Energy of an Optically-Pumped Amplifier by Repetition Rate," filed May 19, 2004, which is incorporated by reference. More than one amplifier may be used in a "train" mode whereby pulses from one amplifier are delayed so as to arrive one or more nanoseconds after those from another amplifier, or only a few picoseconds after those from the other amplifier. This technique allows step-wise control of ablation rate independent of pulse energy.

As indicated above, an auxiliary beam may be used to indicate to an operator where the ablation is to take place. The auxiliary beam may be of the same or a different wavelength than the ablation beam. The auxiliary beam may have a line or area shape and may be scanned such that the beam scan length may be the same as the length of the auxiliary beam. In this way, the length of a cut can be displayed before the ablation takes place. The area of ablation can be similarly displayed and controlled.

In exemplary embodiments, the ablation has a threshold of less than 1 Joule per square-centimeter, but occasionally surgical removal of foreign material may require dealing with an ablation threshold of up to about 2 Joules per square centimeter. An ablation system embodying the invention may be operated with pulses at about three times the ablation threshold for greater ablation efficiency. In some embodiments, ablation rate may be controlled independent of pulse energy. At lower desired ablation rates, one or more amplifiers in a "train" mode can be shut off (e.g., by cutting off the optical pumping to the amplifier), so that there will be fewer pulses per train, and consequently a lower pulse repetition rate. Thus with twenty amplifiers, there may be a maximum of twenty pulses in a train, even though in some applications, only a few amplifiers may be used, resulting in that number of pulses per train. For example, a temporal duration of a train may be 10 nanosecond while all but four amplifiers in a "train" mode are shut off, resulting in a pulse repetition rate of 0.4 pulses per nanosecond. Alternatively, if none of the twenty amplifiers in the "train" mode are shut off, the pulse repetition rate may be 2 pulses per nanosecond.

In some embodiments, the amplifiers (e.g., Cr:YAG or fiber amplifiers) are optically-pumped quasi-CW (e.g., pumping and amplifying perhaps 500 times per second in 1 millisecond bursts). In quasi-CW, there is a pause between bursts, and the ratio of durations of the pause and the burst may be adjusted for component temperature or average repetition rate control. Alternately, non-CW-pumping may be used in operating amplifiers, with amplifiers run in a staggered fashion (e.g., one on for a first half-second period and then turned off for a second half-second period, and another amplifier, dormant during the first-period, turned on during the second period, and so forth) to spread the heat load.

Ablative material removal has been performed using systems with optical benches weighing about 1,000 pounds and occupying about 300 cubic feet or more of physical space. In contrast, a system embodying embodiments of the invention can weigh less than 100 pounds and occupy less than 2.5 cubic feet. Such a system may be carried or moved by a single person (e.g., on a cart or in a backpack configuration).

In some embodiments, pulses may be between 10 picoseconds and one nanosecond. The pulses may be selected by a pulse selector. The selected pulses may be amplified by a power amplifier (e.g., an erbium-doped fiber or Cr:YAG amplifier). The pulses may then be compressed by an air-path between gratings compressor (e.g., a Treacy grating compressor), with the compression creating a sub-picosecond ablation pulse.

Several embodiments are specifically illustrated and/or, described herein. However, it will be appreciated that modifications and variations are covered by the above teachings and within the scope of the appended claims without departing from the spirit and intended scope thereof. For example, the Bragg grating can be tuned mechanically, thermally, or using a piezo device. For example, optically compression or expansion devices other than Bragg gratings may be used. Further, the systems and methods disclosed herein with reference to stretching a pulse may be adapted by one of ordinary skill in the art to compressing a pulse. Likewise, the systems and methods disclosed herein with reference to compressing a pulse may be adapted by one of ordinary skill in the art to stretching a pulse. For example, embodiments including a fiber Bragg grating or volume Bragg grating may be adapted by reversing direction of the grating. Embodiments including a Bragg waveguide may be adapted by changing the characteristics of the Bragg waveguide. The systems and methods described herein may be adapted to other types of pulse stretching and compressing optics, other than Bragg gratings.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A method comprising:
   generating an optical pulse;
   stretching the optical pulse to produce a stretched optical pulse;
   producing a dispersion-compensated optical pulse by passing the stretched optical pulse through a polarization-maintaining fiber including a nonlinear Bragg grating;
   circulating the dispersion-compensated optical pulse through the polarization-maintaining fiber including the nonlinear Bragg grating;
   producing an amplified optical pulse from the dispersion-compensated optical pulse; and
   compressing the amplified optical pulse.

2. The method of claim 1 further comprising passing the amplified optical pulse through a length of polarization-maintaining fiber before compressing the amplified optical pulse.

3. A method comprising:
   generating an optical pulse;
   producing a dispersion-compensated optical pulse by passing the optical pulse through a polarization-maintaining fiber including a nonlinear Bragg grating;
   circulating the dispersion-compensated optical pulse through the polarization-maintaining fiber including the nonlinear Bragg grating;
   stretching the dispersion-compensated optical pulse to produce a stretched optical pulse;
   producing an amplified optical pulse from the stretched optical pulse; and
   compressing the amplified optical pulse.

4. The method of claim 3 further comprising passing the amplified optical pulse through a length of polarization-maintaining fiber before compressing the amplified optical pulse.

5. A method comprising:
   generating an optical pulse;
   producing a stretched and dispersion-compensated optical pulse by passing the optical pulse through a polarization-maintaining fiber including a nonlinear Bragg grating;
   circulating the stretched and dispersion-compensated optical pulse through the polarization-maintaining fiber including the nonlinear Bragg grating;
   producing an amplified optical pulse from the stretched and dispersion-compensated optical pulse; and
   compressing the amplified optical pulse.

6. The method of claim 5 further comprising passing the amplified optical pulse through a length of polarization-maintaining fiber before compressing the amplified optical pulse.

7. The method of claim 5 further comprising directing the compressed amplified optical pulse toward a target as an ablation beam.

8. The method of claim 7 further comprising focusing the ablation beam through a variable-focus lens onto the target using a controller.

9. The method of claim 7 further comprising sensing a reflection from the target and controlling the ablation beam according to a color of the target area.

* * * * *